US 12,174,358 B2

(12) United States Patent
Fine et al.

(10) Patent No.: US 12,174,358 B2
(45) Date of Patent: Dec. 24, 2024

(54) PORTABLE IMAGING DEVICE

(71) Applicant: Alentic Microscience Inc., Halifax (CA)

(72) Inventors: Alan Marc Fine, Prospect (CA); Joel Ironstone, Toronto (CA); Christopher Gillespie, Toronto (CA)

(73) Assignee: Alentic Microscience Inc., Halifax (CA)

(*) Notice: Subject to any disclaimer, the term of this patent is extended or adjusted under 35 U.S.C. 154(b) by 0 days.

(21) Appl. No.: 17/931,414

(22) Filed: Sep. 12, 2022

(65) Prior Publication Data

US 2023/0110857 A1 Apr. 13, 2023

Related U.S. Application Data

(62) Division of application No. 17/193,680, filed on Mar. 5, 2021, now Pat. No. 11,442,261.

(60) Provisional application No. 62/986,363, filed on Mar. 6, 2020.

(51) Int. Cl.
  *G02B 21/26* (2006.01)
  *G02B 21/00* (2006.01)
  *G02B 21/06* (2006.01)
  *G02B 21/34* (2006.01)

(52) U.S. Cl.
  CPC ....... *G02B 21/008* (2013.01); *G02B 21/0028* (2013.01); *G02B 21/06* (2013.01); *G02B 21/34* (2013.01)

(58) Field of Classification Search
  CPC ........... G02B 21/00; G02B 21/0004; G02B 21/0016; G02B 21/0028; G02B 21/008; G02B 21/06; G02B 21/24; G02B 21/26; G02B 21/34; G02B 21/362
  USPC ................................ 359/368–398
  See application file for complete search history.

(56) References Cited

U.S. PATENT DOCUMENTS

| 3,620,596 | A | | 11/1971 | Binnings et al. |
| 5,463,223 | A | | 10/1995 | Wong et al. |
| 5,796,909 | A | | 8/1998 | Islam |
| 5,812,312 | A | | 9/1998 | Lorincz |
| 6,137,627 | A | * | 10/2000 | Engelhardt ............ G02B 21/26 359/392 |
| 6,411,434 | B1 | | 6/2002 | Eastman et al. |

(Continued)

FOREIGN PATENT DOCUMENTS

WO   WO 2019/086543   5/2019

OTHER PUBLICATIONS

International Preliminary Report on Patentability in International Application No. PCT/CA2021/050299, mailed on Sep. 15, 2022, 8 pages.

(Continued)

*Primary Examiner* — Thong Q Nguyen
(74) *Attorney, Agent, or Firm* — Fish & Richardson P.C.

(57) ABSTRACT

A base assembly includes an imaging sensor having a sensor surface to receive a sample, and a platform connected to the base assembly. The base assembly includes (a) an aperture configured to receive a lid surface of a lid in a position to define an imaging space between the sensor surface and the lid surface and (b) a movement portion movable toward and away from the base assembly. The platform and the base assembly are configured to limit contact between the sample and the base assembly other than at the sensor surface.

22 Claims, 21 Drawing Sheets

(56) References Cited

U.S. PATENT DOCUMENTS

| | | |
|---|---|---|
| 9,518,920 B2 | 12/2016 | Fine |
| 10,684,278 B1 | 6/2020 | Fine |
| 10,753,851 B2 | 8/2020 | Fine |
| 11,112,593 B2* | 9/2021 | Fine .................. G01N 1/38 |
| 2002/0044347 A1* | 4/2002 | Steenblik .......... G02B 27/0012 |
| | | 359/383 |
| 2011/0096157 A1 | 4/2011 | Fine |
| 2012/0224053 A1 | 9/2012 | Vykoukal et al. |
| 2014/0152801 A1 | 6/2014 | Fine et al. |
| 2015/0002834 A1 | 1/2015 | Fine et al. |
| 2016/0056577 A1 | 2/2016 | Hirose et al. |
| 2017/0059843 A1 | 3/2017 | Mangham et al. |
| 2017/0241898 A1 | 8/2017 | Okino et al. |
| 2017/0293133 A1 | 10/2017 | Fine |
| 2019/0056304 A1 | 2/2019 | Gershtein |
| 2020/0309777 A1 | 10/2020 | Fine |

OTHER PUBLICATIONS

European Search Report in Application No. EP 241765160, dated Jul. 17, 2023, 8 pages.
International Search Report and Written Opinion in International Appln. No. PCT/CA2021/050299, dated May 19, 2021, 14 pages.

* cited by examiner

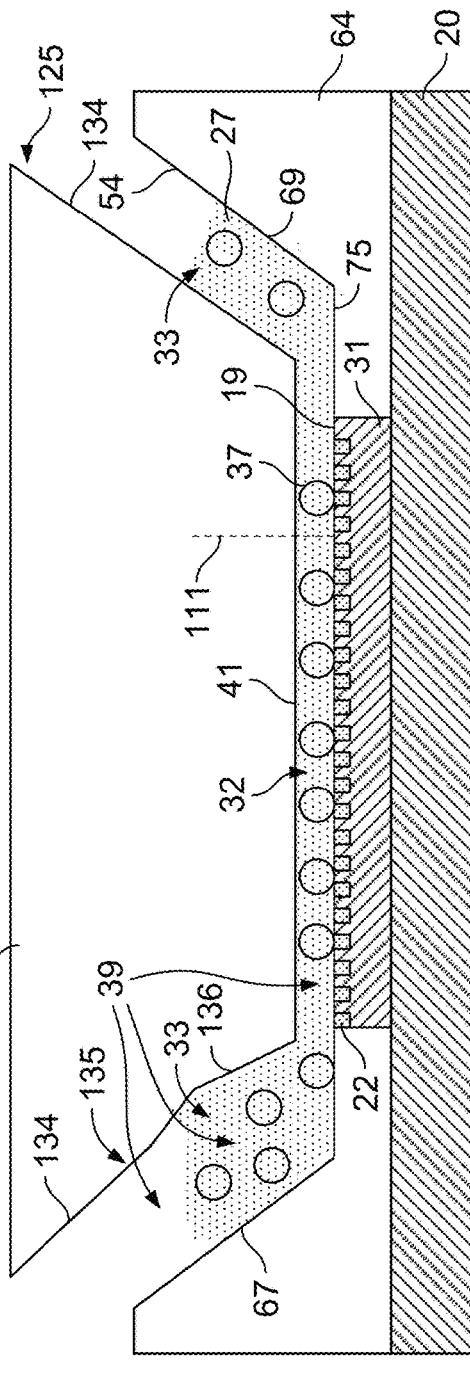
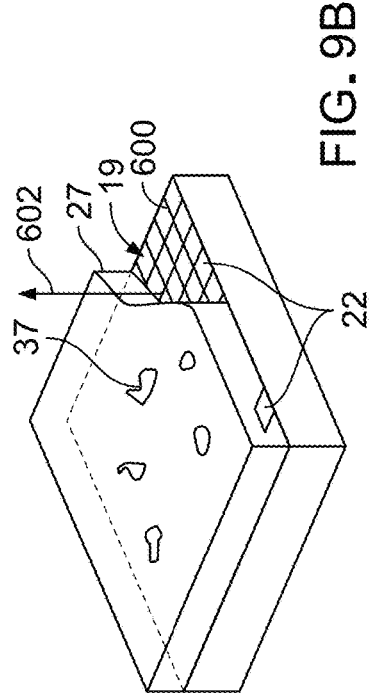
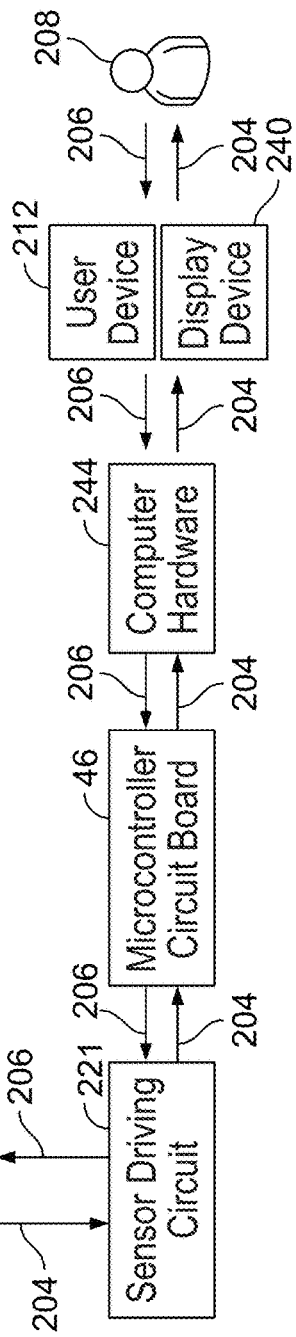

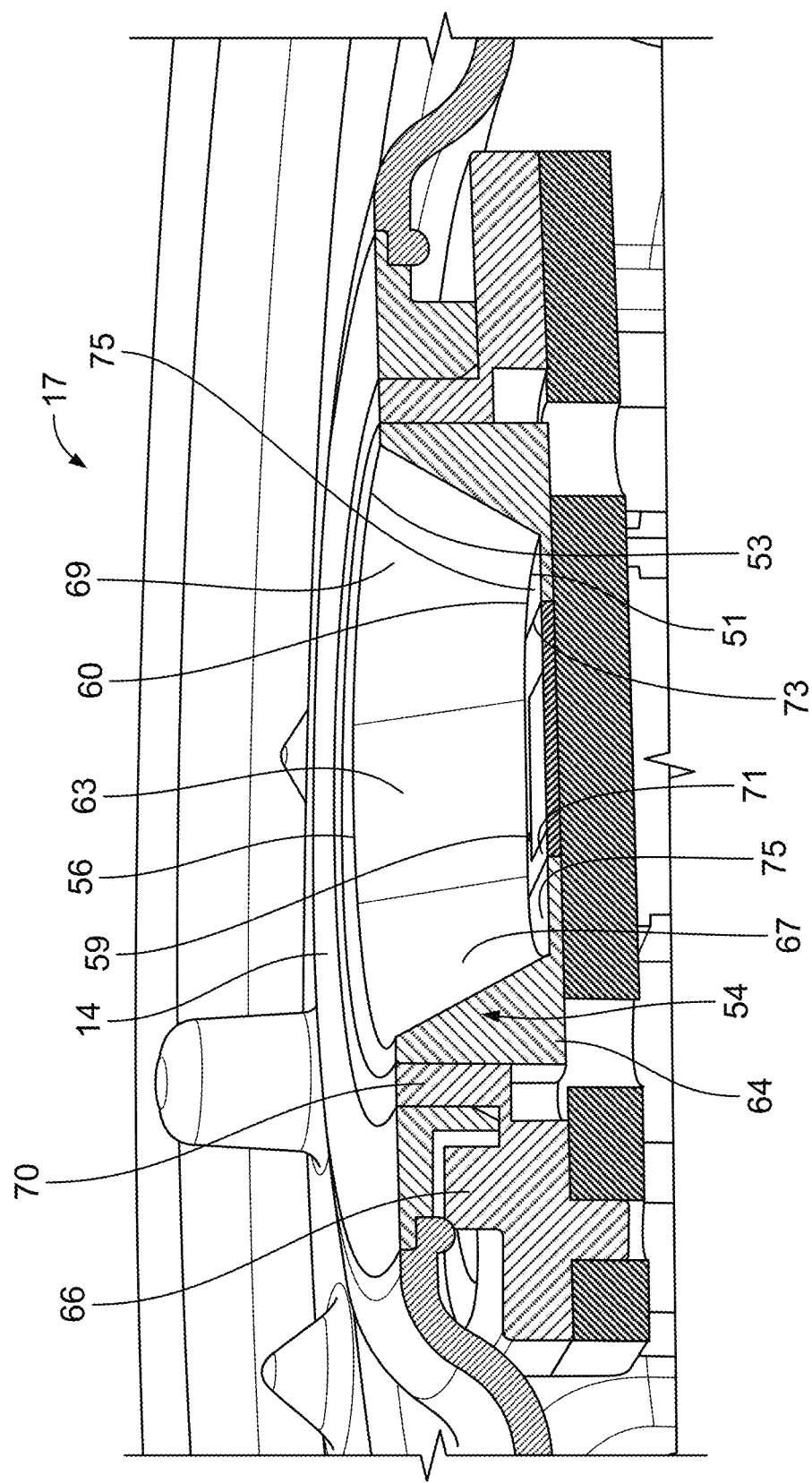

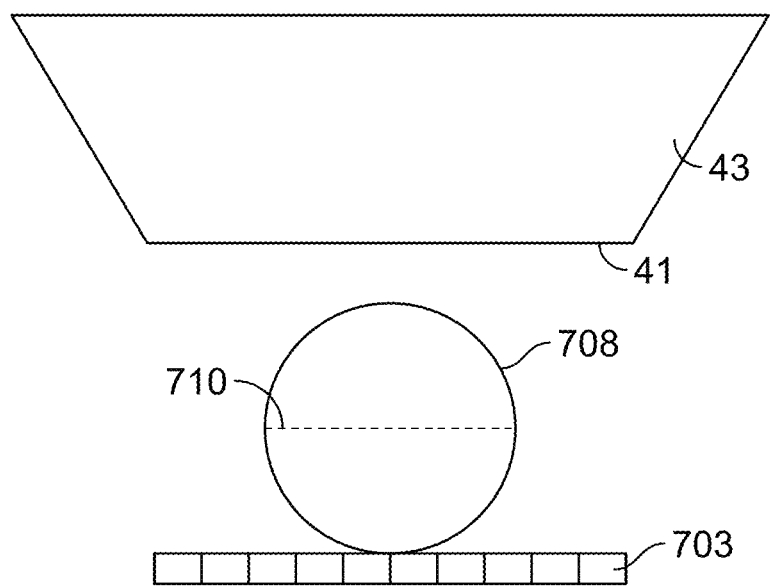
FIG. 16B
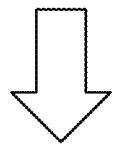
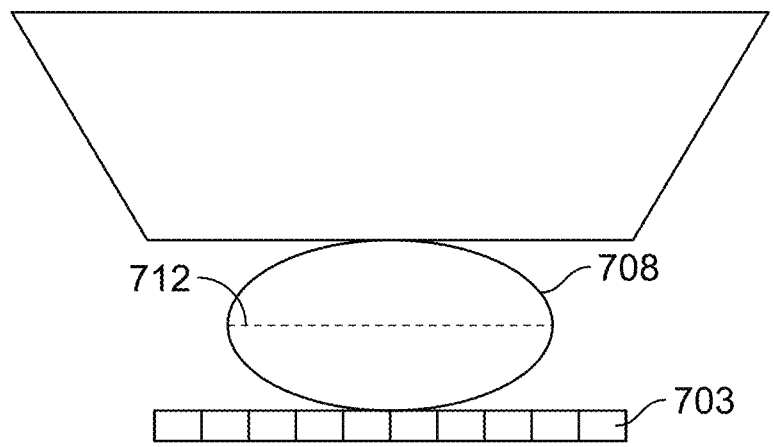
FIG. 16C

PORTABLE IMAGING DEVICE

CROSS-REFERENCE TO RELATED APPLICATION

This application is a divisional of and claims priority to U.S. application Ser. No. 17/193,680, filed Mar. 5, 2021, now U.S. Pat. No. 11,442,261, which claims the benefit of priority to U.S. Provisional Patent Application No. 62/986,363, filed on Mar. 6, 2020, the entirety of which are hereby incorporated by reference.

BACKGROUND

In contact microscopy, by placing a fluid or dry sample on or near an imaging sensor, capturing two-dimensional images of the sample using the imaging sensor, and processing the images, a wide variety of applications become possible. Because lenses and related structural components typical of conventional microscopy are not needed in contact microscopy, applications can be achieved in small portable devices. The applications can include a variety of analyses, for example, counting of units of constituents of the sample (such as blood cells and other constituents of blood). Additional information about contact microscopy and applications of it can be found in the following United States patents and published patent applications, which are incorporated here by reference in their entirety: U.S. patent application Ser. No. 14/173,500, filed Feb. 5, 2014; U.S. patent application Ser. No. 14/314,743, filed Jun. 25, 2014; U.S. patent application Ser. No. 15/066,065, filed Mar. 10, 2016; U.S. patent application Ser. No. 14/572,164, filed Dec. 16, 2014; and U.S. patent application Ser. No. 16/197,265, filed Nov. 20, 2018.

In some applications of contact microscopy, the sensor is mounted on a circuit board that is part of an assembly also including other electronic components and mechanical components. When a sample is applied (placed on or close) to the imaging sensor, portions of the sample may also contact one or more of the other electronic components and mechanical components. In some applications, for example, when the sample includes human blood, it is desirable to avoid having the sample touch, and therefore contaminate, the other electronic components and mechanical components.

SUMMARY

In general, in an aspect, a base assembly includes an imaging sensor having a sensor surface to receive a sample, and a platform connected to the base assembly. The base assembly includes (a) an aperture configured to receive a lid surface of a lid in a position to define an imaging space between the sensor surface and the lid surface and (b) a movement portion movable toward and away from the base assembly. The platform and the base assembly are configured to limit contact between the sample and the base assembly other than at the sensor surface.

Implementations may include one or a combination of two or more of the following features. The platform includes one or more attachment portions configured to attach the platform to the base assembly. The platform includes a pliant portion coupled to the movement portion. The pliant portion includes at least two discontinuous sections. The two discontinuous sections are coupled by a rigid section. A movement mechanism is coupled to the movement portion. An actuator is coupled to the movement portion or the movement mechanism or both and configured to move the movement portion toward and away from the base assembly. The platform includes a peripheral surface configured to bound a sample space situated between the peripheral surface, the sensor surface, and another surface. The sample space includes the imaging space. The platform and base assembly are configured to cause a portion of the sample to be in the sample space but outside the imaging space. The top surface of the platform includes one or more protruding or depressed features. The protruding or depressed features correspond to features on a lid. The protruding or depressed features cause the lid to rest on the movement portion in a tilted orientation. The lid has a lid surface configured to define an imaging space between the sensor surface and the lid surface. The lid surface includes a protruding element that is configured to fit into the platform aperture. The protruding element includes a prism. The protruding element includes a trapezoidal prism. The protruding element includes a truncated feature. The truncated feature includes a truncated cone. The lid is disposable. The lid and platform are configured so that, as the lid is moved towards the base assembly while a sample is in the sample space, the lid comes to rest on the sample and be unsupported by the movement portion of the platform. The lid and platform are configured so that, as the lid is moved towards the base assembly, the lid surface becomes parallel to the sensor surface. The lid has a surface on which one or more agents are disposed. Some or all elements include materials resistant to at least one cleaning or disinfection agent.

In general, in an aspect, a sample is placed on a surface of an imaging sensor that is on a base assembly. At least part of the sample is confined to an imaging space adjacent the surface of the imaging sensor. Contact between the sample and the base assembly that would otherwise result from confining at least a part of the sample is limited or prevented.

Implementations may include one or a combination of two or more of the following features. The sample is mixed at the surface of the imaging sensor. The confining includes moving a surface of a lid toward the sensor surface. A surface of the lid is aligned with the sensor surface along an X-axis and a Y-axis and rotationally. The part of the sample within the imaging space is imaged. Elements within the sample are counted. One or more reagents are mixed into the sample at the imaging space. The sample is heated, cooled, or both heated and cooled, at the surface of the imaging sensor.

In general, in an aspect, a disposable sample cassette includes a frame defining an aperture, and a transparent film covering the aperture, the transparent film having a thickness of less than 3 microns and being configured to receive a microscopy sample.

Implementations may include one or a combination of two or more of the following features. The frame includes a protruding window, and the protruding window defines the aperture. The protruding window has a size and a shape configured to receive a lid inserted into the protruding window. The size and the shape of the protruding window correspond to a respective size and a respective shape of a surface of the lid. The inner surfaces of sidewalls of the protruding window are shaped to define a separation between the sidewalls and the lid after the lid is inserted into the protruding window. The cassette includes one or more engaging structures configured to attach the cassette to a lid. The engaging structures permit movement of the lid toward and away from the thin film. The cassette includes one or more agents disposed on the transparent film. The transparent film includes two opposite surfaces, and the two opposite surfaces are at least partially exposed. The transparent film includes a thermoplastic polymer.

In general, in an aspect, a method includes depositing a microscopy sample onto a thin film, the thin film covering an aperture defined in a sample cassette, placing the sample cassette in contact with or in close proximity to a sensor surface of an imaging sensor, the thin film being between the sample and the sensor surface and at least a portion of the sample being within a near-field distance of the sensor surface, and imaging the sample using the imaging sensor.

Implementations may include one or a combination of two or more of the following features. The method includes contacting the sample with a lid surface of a lid, the sample being between the lid surface and the thin film, and moving the lid surface towards the thin film to form a thin layer of sample between the lid surface and the thin film. The thin layer of sample includes a monolayer of elements of the sample. The method includes moving the lid surface towards and away from the thin film repeatedly so as to cause mixing of the microscopy sample. The method includes attaching the lid to the cassette using an engaging structure of the cassette. The engaging structure permits movement of the lid toward and away from the thin film within a defined range. The method includes depositing a liquid between the thin film and the sensor surface.

In general, in an aspect, a computer-implemented method includes obtaining one or more images of a lid surface and a sample disposed between the lid surface and an image sensor, the one or more images having been captured by the image sensor; and, based on the one or more images, determining a height of the lid surface with respect to a surface of the image sensor.

Implementations may include one or a combination of two or more of the following features. A mark on the lid surface is identified, and the height of the lid surface is determined based on the mark. The height of the lid surface is determined based on triangulation of the mark. The sample includes a bead, a deformation of the bead is determined, and the height of the lid surface is determined based on the deformation of the bead.

In general, in an aspect, a clamshell includes a first assembly, a second assembly, and a coupling between the first assembly and the second assembly. The coupling is configured to close the first assembly with respect to the second assembly to enclose a space between the first assembly and the second assembly, and further configured to separate portions of the first assembly and portions of the second assembly to expose the space. The clamshell includes a sensor, the sensor including an array of light-sensitive elements and a first surface that is exposed within the space. The clamshell includes a chamber lid including a second surface. The clamshell includes a mechanism configured to cause the chamber lid to move so that the second surface moves controllably toward the first surface when the first assembly is closed with respect to the second assembly, and so that the second surface moves controllably away from the first surface when the first assembly is closed with respect to the second assembly.

In general, in an aspect, an apparatus includes a sensor including an array of light-sensitive elements and a first surface; a support that supports the sensor; a chamber lid including a second surface; a coupling component between the support and the chamber lid, the coupling component configured to allow movement of the chamber lid relative to the support to provide access to the first surface; and a lifting mechanism configured to controllably move the chamber lid and the coupling component toward and away from the first surface and to permit the chamber lid to float relative to the coupling component as the coupling component is moved toward the first surface.

These and other aspects, features, implementations, and advantages (a) can be expressed as methods, apparatus, systems, components, program products, business methods, means or steps for performing functions, and in other ways, and (b) will become apparent from the following description and from the claims.

BRIEF DESCRIPTION OF DRAWINGS

FIG. 9A is a schematic view of an imaging system.
FIG. 9B is a perspective view of an imaging system.
FIG. 10 is a perspective enlarged cut-away view of a portion of a platform on a device.
FIGS. 16B-16C are side views of a compliant bead on a sensor surface.

DETAILED DESCRIPTION

Among other things, here we describe imaging devices capable of receiving a fluid or dry sample on a light sensitive surface of a two-dimensional high resolution imaging sensor, driving the sensor to produce image data, and analyzing the image data to generate analytical information about elements of various types present in the sample and information derived from that analytical information. The generated analytical information and the derived information can be communicated to other devices or presented to users or both. In some cases, the device is portable, for example, is self-contained, small enough to be held in one or both hands of a user or placed in a small area on a table, and does not require any wired connections to any other device. In some examples, the device is suitable for point-of-care use in a health-care context or field use in places where devices capable of performing such analyses are not readily available. In some implementations, the device can analyze blood samples drawn from humans and provide complete blood counts and a variety of other information about the blood samples within a very short time and in essentially any location.

In some implementations, the sample is held between the surface of the imaging sensor and a lid surface of a movable lid that can be moved into a position at a specific distance from the sensor surface. In some examples, the imaging sensor is held on a base assembly, the lid is movable relative to the base assembly, and both the lid and the base assembly are contained within a housing that can be opened to enable a user to place a sample on the light sensitive surface of the imaging sensor, closed during the process of imaging the sample, and reopened to remove that sample and replace it with another sample, repeating the cycle.

A wide variety of implementations of the imaging devices are possible, including a range of mechanical, electrical, and data processing components and combinations of them.

Figure 1:
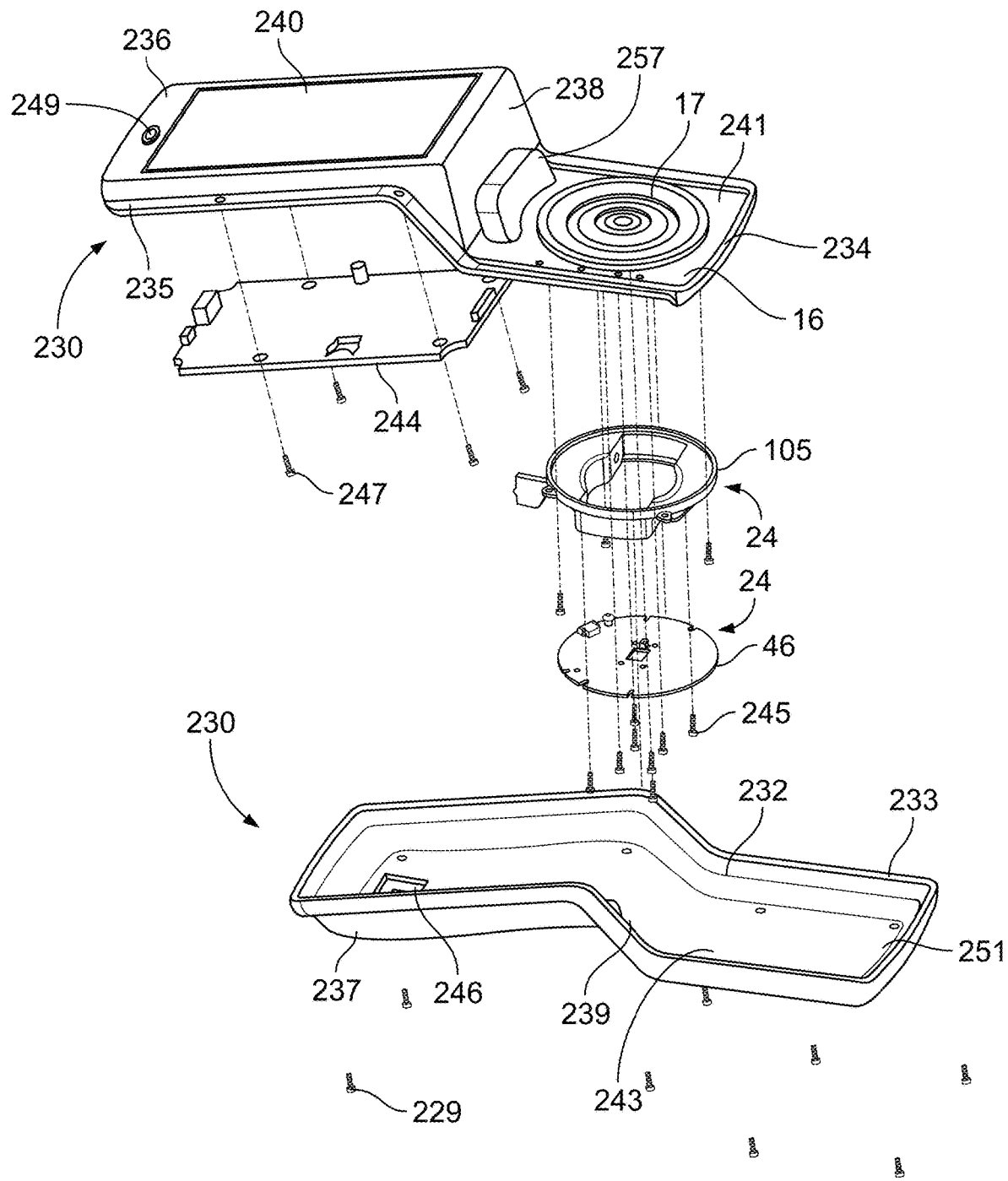
FIG. 1 is a perspective view of a housing and device.

As shown in FIG. 1, in some implementations, the base assembly 24 can be mounted in a handheld housing 230 that contains mechanisms for supporting data acquisition (image data and other data) and analysis. The handheld housing includes two single-piece plastic shells, with each of the bottom shell 232 and the top shell 234 divided into two plates 236, 241 and 243, 237 connected by a bridging segment 238, 239. The shells are similarly shaped with oppositely-contoured curved edges 233, 235, such that they can be screwed together at their edges using screws 229 to leave the shells' edges held tightly together with a hollow space between the shells to contain other components. In some implementations, each plastic shell may be, for example, made of two or more separate plastic pieces.

One plate 241 of the top shell is configured to receive the base assembly, a platform 17, and an illuminator unit, described in further detail below. The platform, described in more detail below, can help to limit contact between the sample and the rest of the portable device. In some embodiments, the platform 17 is integrated into the plate 241, and rigid sections of the platform can be fabricated with the plate as a single piece of plastic connected by over-molded pliant platform segments. Underneath and near the four corners of the plate 241, magnets or metal (not shown) pull on corresponding magnets 242 on the illuminator unit (see below), holding the illuminator unit 300 in place on the handheld housing after a sample has been placed and the imaging is being done. Beneath the platform, the base assembly fits in between the top shell and the bottom shell, fitting into a corresponding receiving area 251 of the bottom plate 243. Screws 245 hold a base frame 105 and a microcontroller circuit board 46, each a part of the base assembly, to the plate 241. The plate 241 also has a raised, curved alignment section 257 that guides the placement of the edge of the illuminator unit with respect to the plate 241, the platform 17, and the base assembly 24.

The base assembly 24 can include features for receiving a sample on or near a sensor surface; mixing, incubating, and incorporating reagents into the sample, and otherwise processing the sample; and imaging the sample, in a variety of combinations and permutations. In some uses, a portion of the sample is imaged while the sample is held in a sample space between a lid surface and a sensor surface on the base assembly. Features of the base assembly and lid that define that sample space and assist in imaging the sample are described in further detail below.

Figure 2:
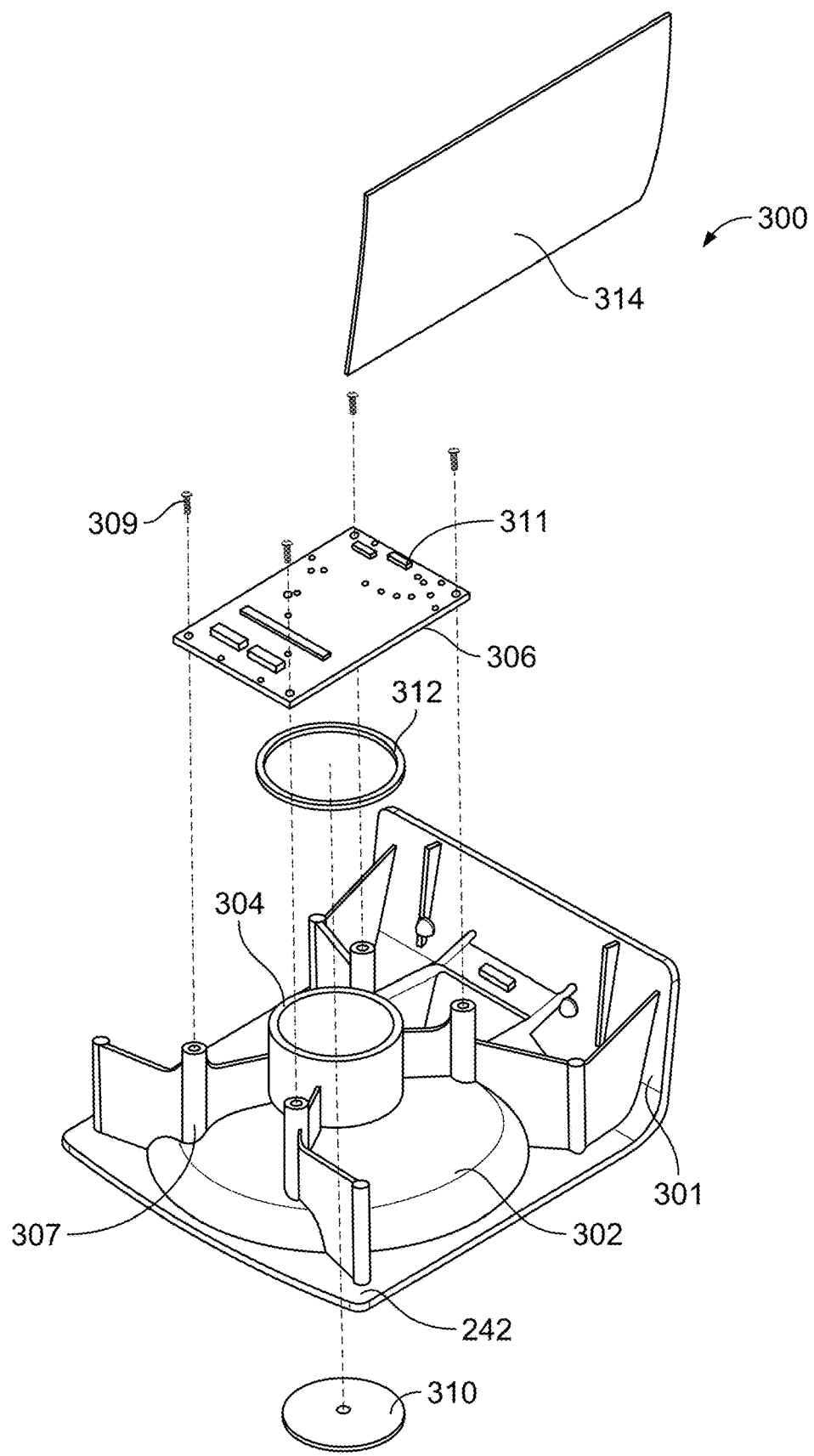
FIG. 2 is a perspective view of an illuminator unit.

The illuminator unit 300, shown in FIG. 2, includes a rectangular shell 301 having a circular, arched inner section 302 in which a lid can be positioned. Excess space inside the arched section 302 allows the lid to move within the illuminator unit 300 in response to the raising and lowering of a movement portion of the platform. At the corners of the shell, magnets 242 align with magnets or metal in the handheld housing 230 and are configured to cause an attractive force to hold the illuminator unit 300 and the handheld housing 230 until a user pulls them apart. The magnets 242 can also have the effect of ensuring correct two-dimensional lateral alignment between the lid and an aperture of the platform. Portions of or all of the arched inner section 302 can be transparent to facilitate the passage of light, as described below. The lid is discussed in further detail below in reference to FIGS. 9a and 15.

In some implementations, the magnetic and screw fittings described above may instead be another type of fitting, e.g., hinged fittings.

At the center of the arched inner section 302 is a hollow cylindrical portion 304 Four posts 307 and corresponding screws 309 hold a circuit board 306 in position above the top of this cylindrical portion, with the top and bottom surfaces of the circuit board oriented perpendicular to the longitudinal axis of the cylindrical portion. A lighting array, connected to and controlled by computer hardware through a light driving circuit 311 on the circuit board 306, is bonded to the side of the circuit board that faces the handheld housing, such that light from the lighting array can illuminate the sample and the sensor surface through a transparent lid. An illuminator unit top (a portion of which 314 is shown in FIG. 2) fits around the circuit board and other components of the illuminator unit, protecting them from contamination and damage.

The lighting array can include light-emitting elements (e.g., LEDs) of multiple (for example, three) wavelengths, and can include supplementary elements emitting infrared light or ultraviolet light. Light-emitting elements can be, for example, grouped in sections of three LEDs, each LED in each section emitting a different wavelength of light. The lighting array can include elements designed to emit light matching an absorption peak of a common sample element, for example, hemoglobin.

Light from the lighting array is collimated by a lens 310 held inside the cylindrical portion 304 by a retaining ring 312. The lens 310 can be held against a plastic stop in the cylindrical portion 304. Although this lens 310 produces a generally parallel beam of light directed at the sensor surface, slight changes in the angle of the beam occur when different lighting elements in the lighting array are activated. This fact can be exploited to derive subpixel-resolution final images from a combination of raw images, each image taken with a different set of lighting elements activated. We use the term "subpixel-resolution" to include, for example a resolution smaller than the size of light-sensitive elements that make up the imaging sensor.

In some implementations, single-color images are captured and then combined, enabling the generation of full-color final images based on illumination colors corresponding to different respective images even when the imaging sensor is monochromatic, responsive only to intensities of light.

Because the illuminator unit 300 is held in place on the handheld housing only by the magnets 242, and because the platform limits contact between the sample and components of the rest of the imaging device other than the surface of the sensor, a user can easily attach a fresh disposable lid onto the platform, place a sample onto the sensor surface when the illuminator unit is removed, attach the illuminator unit by hand, acquire sample image data using the light source and the imaging sensor, remove the illuminator unit by hand, wipe clean the platform and imaging sensor, replace the lid, and process a new sample. As part of acquiring image data, the device can, automatically or in response to instructions from a user, (a) cause sample mixings interleaved with capturing of successive images, to enhance the statistical significance of the data; (b) mix agents into the sample and incorporate an incubation step; and/or (c) take images using selected sets of lighting elements to acquire sub-pixel or wavelength-dependent data; or a combination of these activities. Further details on the device features for sample and agent mixing are given below.

Computer hardware 244 (shown in FIG. 9A) can communicate with the light driving circuit 311 on the circuit board 306 through, for example, pins on the illuminator unit that contact corresponding sockets in the housing, or by another connection.

Techniques may be applied to uniquely identify each of the disposable lids by a code to prevent the use of unapproved, non-conforming, previously-used or otherwise improper lids with a given device.

In some examples, different illuminator units may be swappable into the device, each illuminator unit having a different configuration of light-emitting elements in the lighting array. Different illuminator units may be configured for use with different samples. For example, each illuminator unit can include respective LEDs emitting in a respective different wavelength suited for detection of different sample components.

The other plate 236 of the top shell contains a built-in liquid crystal touchscreen 240 and a power button 249. These are electrically connected to the computer hardware 244 that is screwed into the top shell using screws 247 and fits between the top shell and the bottom shell. The hardware can perform one or more functions, including driving the touchscreen, controlling a motor microcontroller and a sensor-driving circuit in the base assembly, controlling the light-driving circuit in the illuminator unit, receiving image data, and processing the data to perform, for example, a complete blood count or other analysis. The hardware can include a computer system, e.g., one or more processors and one or more non-transitory, computer-readable media storing an operating system and code executable by the one or more processors to process sets of signals or data derived from the sensor and/or to provide instructions to other components. Each set of such signals or data can represent an image, for example, an image of the sample and the sample elements. The computer hardware can also include networking equipment for transmitting image data or analysis reports to another device or receiving software updates for the executable code, among other possible uses.

The computer hardware in this example also includes an embedded barcode reader oriented to face towards an aperture 246 in the bottom plate 237. Users can position the handheld housing above a barcode, scan the barcode using the barcode reader controlled by interaction with a user interface presented on the touchscreen, and have the information encoded in the scanned barcode incorporated into the device's images or reports or other data. For example, before performing a blood analysis, a user could scan both her own barcode (labeling the test as having been performed by her) and a patient's barcode (reducing errors in assignment of test results to patients).

In some implementations, the code running on the computer hardware can be software, firmware, hardware, or combinations of them. The computer hardware also includes a battery to enable portable use.

The processing of the sets of signals or data by the computer hardware can include a wide variety of signal processing and data processing techniques that enable sample elements in a sample to be identified or counted or the morphology or movement of the elements to be observed or evaluated, or combinations of those activities. For example, the processing can use a neural network (or other kind of classification or modeling technique).

Figure 3:
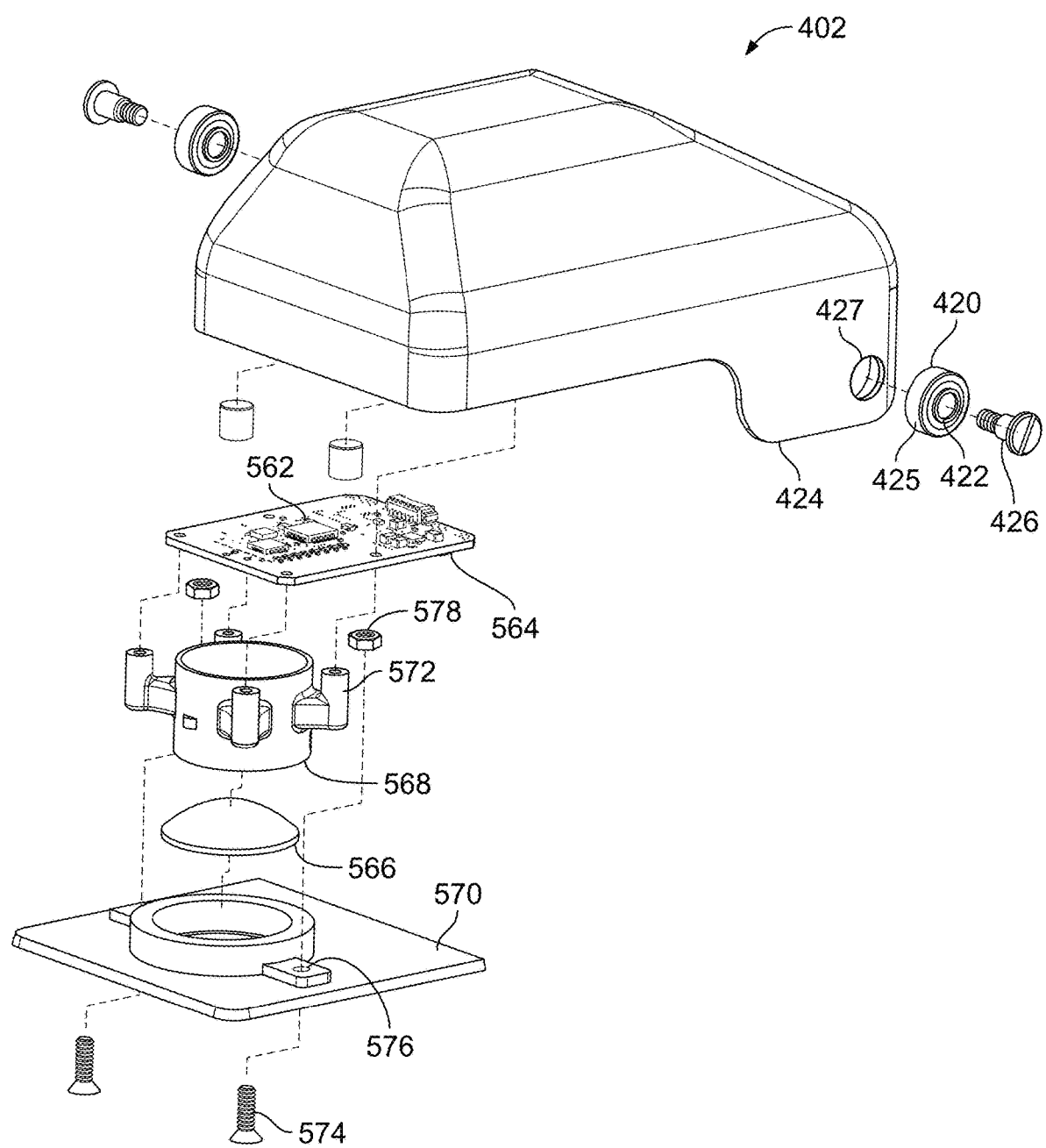
FIG. 3 is a perspective view of an illuminator unit.
Figure 7:
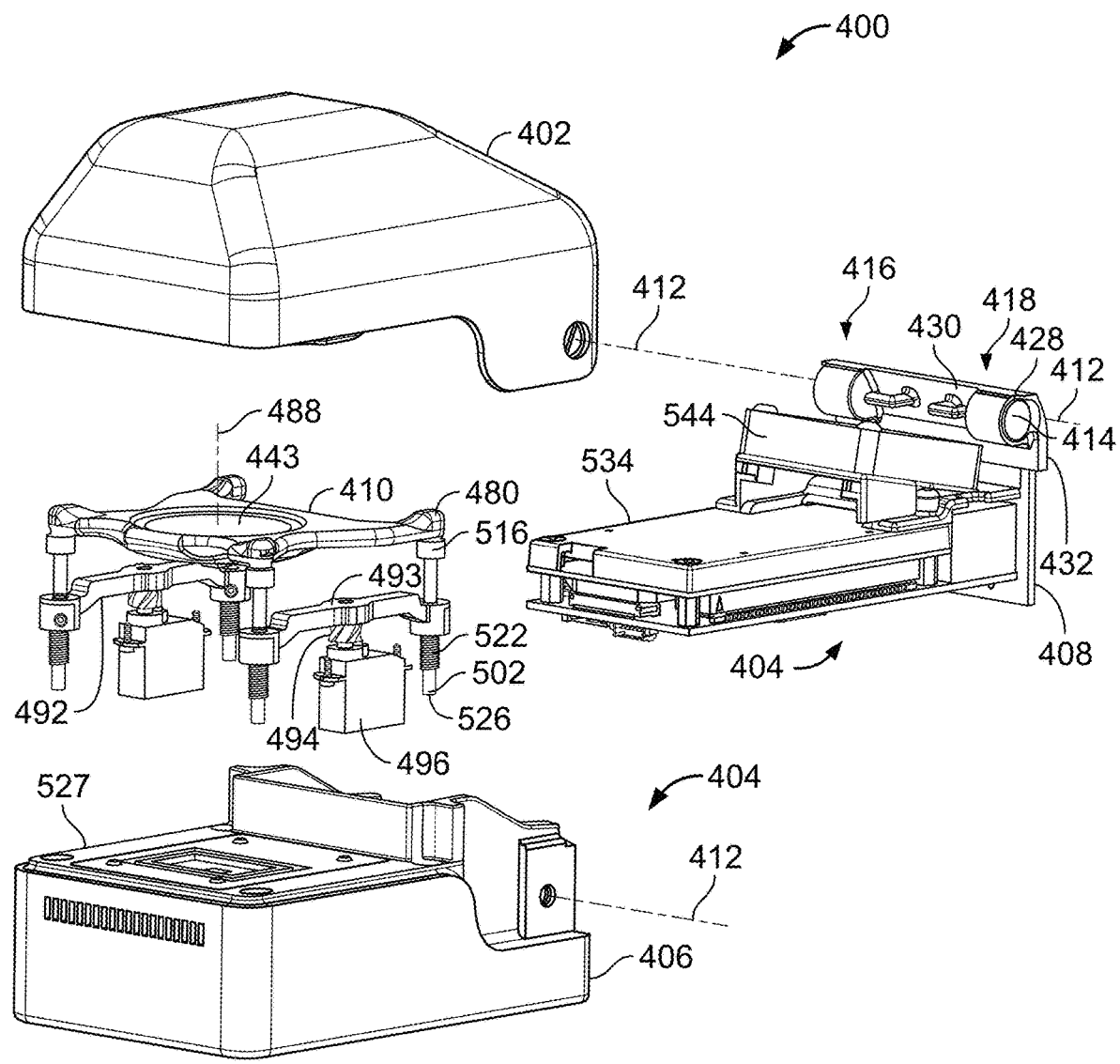
FIG. 7 is a perspective view of a clamshell device.

In some implementations, the illuminator unit takes the form shown in FIG. 3. The illuminator unit 402 in FIG. 3 is a first component 402 of a clamshell imaging device 400 (FIG. 7). A second clamshell component 404 is formed by a combination of a frame assembly 406, a computational assembly 408, and a lift assembly 410. The two clamshell components are held together at an axis 412 by a hinge 414 formed by two bearings 416, 418 to enable the two clamshell components to be rotated about the axis relative to one another to open and close the clamshell repeatedly.

Each of the two bearings includes a rotary damper 420, an inner element 422 of which is held securely against an inner surface of a flap 424 of the illuminator unit 402 by a screw 426 that projects through a corresponding hole 427 in the flap. An outer element 425 is seated in a receptacle 428 formed on an inner surface 430 of a panel 432 of the computational assembly 408. In some implementations, the clamshell may kept fixed in an open position using, for example, magnets in one of the clamshell components magnetically coupling to corresponding magnets or pieces of metal in the other clamshell components.

The frame assembly has a slot (not shown) into which the computational assembly 408 slides for assembly of the clamshell. The lift assembly 410 is mounted on the frame assembly 406 as explained below.

When the clamshell is open and the space within the clamshell is accessible, a variety of activities are possible. For example, a liquid sample can be applied to an imaging sensor, a liquid sample can be removed from the sensor, the sensor can be cleaned or otherwise prepared for a liquid sample, components of the device can be removed, replaced, or maintained, and other activities and combinations of two or more activities can be performed.

When the clamshell is shut, ambient external light is excluded from the space inside the clamshell. In some cases, an internal source of light 562 that is part of a light assembly mounted in the illuminator unit 402, as discussed below, can be turned on, and, while the light source 562 is turned on, one or more sets of signals can be generated by the imaging sensor 31 at one time or at a succession of times. As described above, the sets of signals generated by the imaging sensor are processed and analyzed electronically to derive information about the sample and about sample elements contained in the sample.

We use the term "clamshell" broadly to include, for example, any structure in which pieces can be moved relatively to one another to a closed configuration to enclose a space and exclude external ambient light from the enclosed space, and be moved relatively to one another to an open configuration to permit access to the space.

Figure 6:
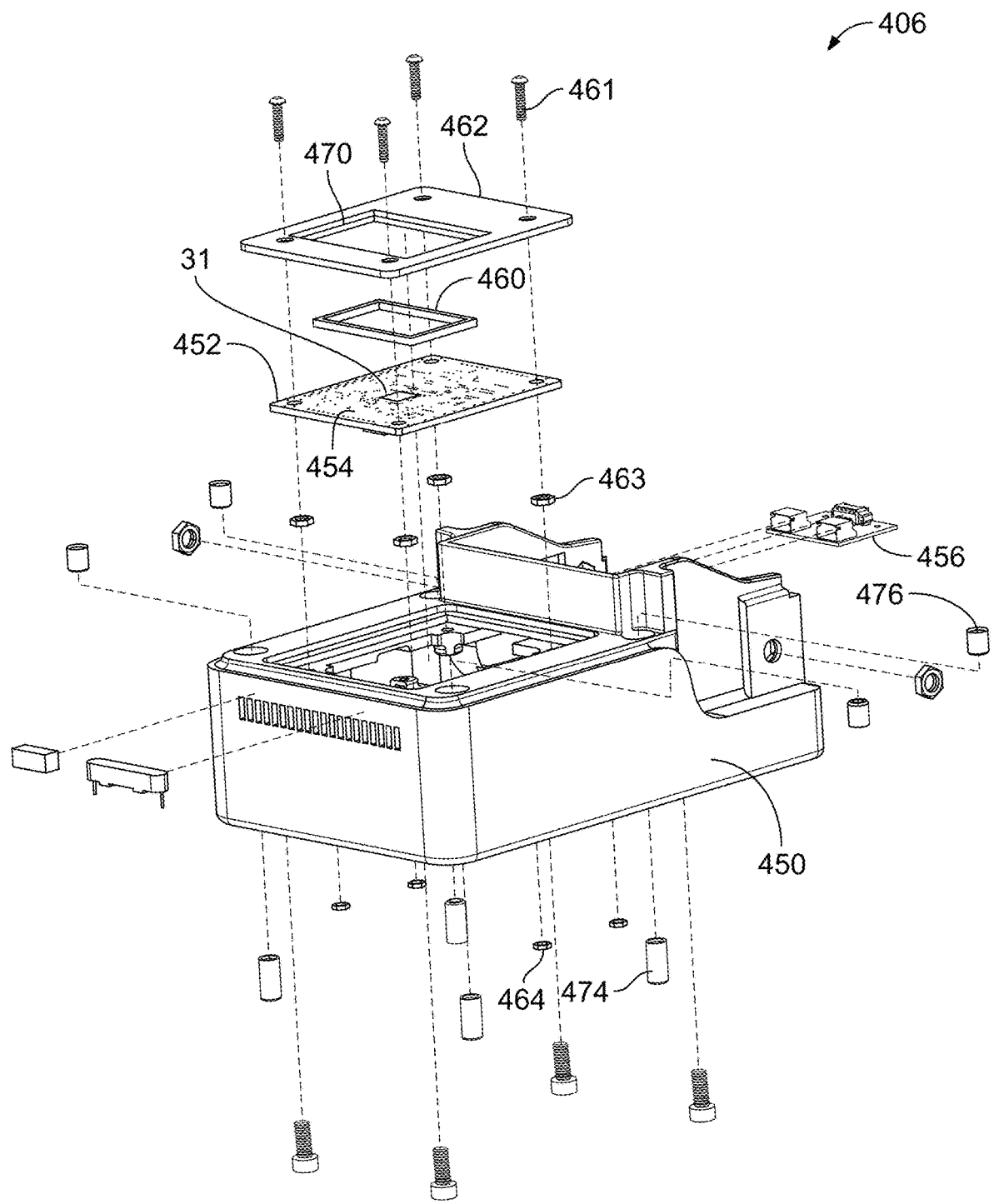
FIG. 6 is a perspective view of a frame assembly.

The frame assembly 406 (which may be termed a base assembly in some implementations) (FIG. 6) contains many of the same elements as the base assembly 24 as described below. It includes a molded plastic frame 450 bearing a sensor headboard 452. A rectangular imaging sensor 31 is mounted on the headboard 452. Further electronic components 454 mounted on the headboard 452 are arranged in circuits for driving and receiving image signals from the sensor 31, processing the received image signals, and generating data corresponding to the image signals, among other things. A coupler 456 associated with the headboard 452 is configured to provide electrical connections between components on the headboard 452 and the computational assembly 408.

The headboard 452, an epoxy dam 460, and a headboard cover 462 are together mounted on the plastic frame 450 using four screws 461 and washers 463 and nuts 464.

The epoxy dam 460 is rectangular and has a central rectangular opening. The epoxy dam 460 fits within a frame 470 provided by the headboard cover 462. As a result, in some implementations, a trough surrounds the sensor 31 and has a width and a length comparable to the width and the length of the central rectangular opening of the epoxy dam 460. The trough and the epoxy dam cooperate to provide a well space surrounding the sensor 31 to receive excess portions of a sample placed on the sensor 31. In some cases, the trough can be formed directly in the sensor headboard using typical fabrication techniques, e.g., by casting epoxy to directly create the trough.

Four larger sleeve bearings 474 are mounted within the plastic frame and four smaller sleeve bearings 476 are configured to be attached to linear shafts described below and to slide up and down within the larger sleeve bearings 474 in order to raise and lower the lift assembly 410 as explained below.

Figure 4:
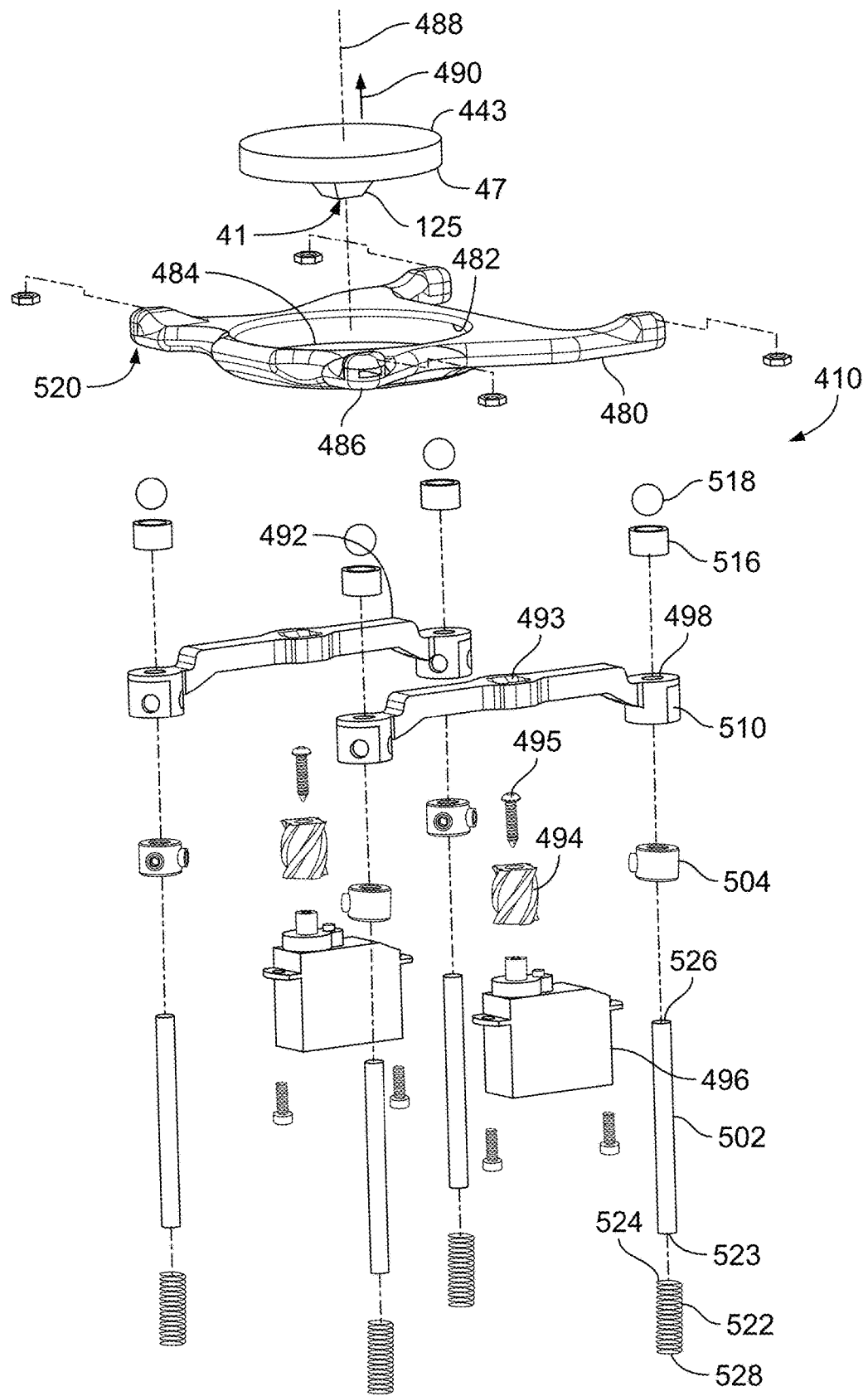
FIG. 4 is a perspective view of a lift assembly.

The lift assembly 410 is configured to move the lid 443 (FIG. 4) closer to and farther away from the surface of the sensor. The lid 443 can have many of the same features as the lid 43 described below in reference to FIG. 15 and throughout this disclosure, though some of the lid 443's characteristics, including the shape of the lid surface 41, the shape of a protruding element 125, and a method of holding the lid in position, can be different. In some implementations, the lid surface 41 is rectangular and has area dimensions corresponding to the area dimensions of the sensor surface. The lid 443 rests in a top plate 480 of the lift assembly 410. A cup 482 formed in the top plate 480 has a floor 484 to receive and support the body 47 of the lid 443. The floor 484 has an aperture 486 through which the protruding element 125 can project. The aperture 486 is sized to match the faces of the protruding element 125, and the edges of the aperture 486 are approximately aligned with corresponding edges of the imaging sensor 31, so that, when the lid 443 is resting in the cup 482 of the top plate 480, the projecting lid surface 41 (a surface of the protruding element 125) is parallel to and facing the surface of the sensor 31, the edges of the lid surface 41 are aligned with the edges of the sensor 31, and the lid is prevented from rotating about an imaginary axis 488 relative to the sensor 31. In some implementations, the lid 443 is not attached to the cup 482 of the top plate 480 but is free to move axially relative to the cup 482 in a direction 490 away from the sensor 31 and in an opposite direction towards the sensor 31.

The lid 443 is supported by and can be moved along the axis 488 toward and away from the sensor 31 by an assembly that includes two support arms 492 (that incorporate an internally threaded hole at the center of each arm to serve as a lead nut 493). Two corresponding lead screws 494 are held by screws 495 on two corresponding rotational actuators (e.g., servo motors) 496.

Each of the support arms 492 has two holes 498 at opposite ends. The internal threads of the threaded hole match external threads of the lead screws 494. By controlling and coordinating the rotations of the rotational actuators, the lead screws 494 in cooperation with the lead nuts cause the lid 443 to move toward and away from the sensor with the projecting surface of the protruding element 142, in some implementations, being maintained parallel to the surface of the sensor 31 and facing the sensor 31.

Smooth and linear motion of the support arms 492 is aided by four parallel linear shafts 502. Four shaft collars 504 are fixed by set screws on the linear shafts 502, and the linear shafts 502 project through the holes 498 in the support arms 492. The shaft collars 504 are seated within cups 510 associated with the holes 498. At the ends of the shafts 502 near the lid are four corresponding shaft-magnet connectors 516. Four spherical magnets 518 are mounted in four sockets 520 of the top plate 480 and are aligned with and configured to cooperate with the shaft-magnet connectors. Therefore, the top plate 480 together with the lid 443 can be temporarily mounted on and held precisely in an intended position and orientation by the lift assembly 410 as long as there is no force tending to pull them apart with a strength larger than the combined attractive force of the four shaft-magnet connectors and the corresponding four magnets.

Four springs 522 slide onto the ends 523 of the shafts 502 nearer to the sensor. The ends 524 of the springs 522 bear against the shaft collars 504 seated in the cups 510. The other ends 526 of the linear shafts 502 are attached to the smaller sleeve bearings 476 mentioned earlier as sliding within the four larger sleeve bearings 474 mounted in four corresponding holes 527 in the top of the frame assembly 406. The bottom ends 528 of the springs 522 bear against the top surface of the frame assembly 406. The springs 522 bias the support arms away from the sensor.

As a result, before a sample is placed on the surface of the sensor 31 or after a sample has been imaged, the top plate 480 can be easily lifted off the lift assembly 410 by hand by a force releasing the four magnets 518 from the four shaft-magnet connectors. The top plate 480 together with the lid 443 can be easily reinstalled in the correct position and orientation by manually aligning the four magnets 518 with the four shaft-magnet connectors.

Once a sample has been placed on the sensor surface and the top plate 480 together with the lid 443 has been mounted on the lift assembly 410, the actuators 496 can be operated to lower the shafts 502 and shaft collars 504 together with the top plate 480 and lid 443. As the lid 443 is lowered, the exposed lid surface 41 eventually touches the sample. As the lowering of the top plate 480 and lid 443 continues, the lid 443 can float relative to the top plate 480 (because it is not coupled to the top plate 480). The lid 443 settles on the sample to form a chamber within which the sample is held. We use the word "chamber" in connection with the word "lid" to note that the exposed surface 41 of the protruding element 125 of the lid 443 and the surface of the sensor form a chamber between them when the lid surface 41 is moved near to the surface of the sensor and at least part of the sample is held in the chamber.

During this process, the top plate 480, the epoxy dam 460, and the headboard cover 462 together limit contact between the sample and other portions of the frame assembly 406.

Figure 5:
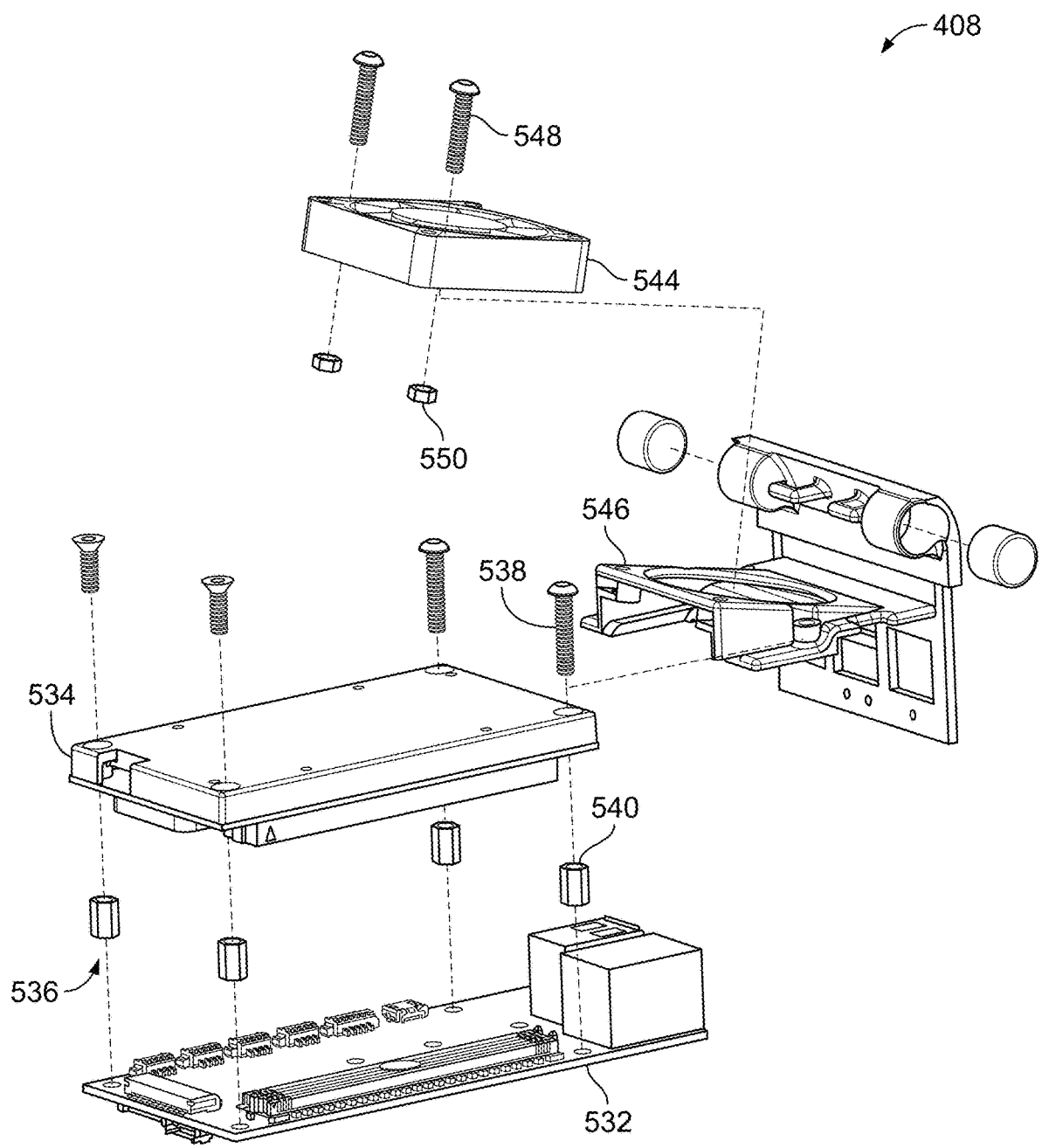
FIG. 5 is a perspective view of a computational assembly.

The computational assembly 408 (FIG. 5) controls the operation of the sensor and electronic components on the headboard and receives the processed signals and data from the electronic components for additional processing, as described for computational components throughout this disclosure. In some implementations, the computational assembly includes an Auvidea Jetson carrier board 532 and a NVIDIA Jetson computational assembly 534 which cooperate to provide a high-power computational system 536. The Jetson computational assembly 534 is mounted on the Jetson carrier board 532 using four screws 538 and four standoffs 540. The high-power computational system 536 is cooled using a fan 544 mounted on a fan bracket 546 using screws 548 and nuts 550. The high-power computational system can have some or all of the same capabilities and features as has the previously-described computer hardware 244.

The illuminator unit 402 (FIG. 3) of the clamshell contains a light source 562 mounted on a printed circuit board 564. Also part of the illuminator unit is a lens 566 held between an upper lens holder 568 and a lower lens holder 570. Four fingers 572 projecting from the upper lens holder 568 provide mounting locations for mounting the printed circuit board 564 in a precise position and orientation relative to the lens 566. Two screws 574 project through two holes 576 on opposite sides of the lower lens holder and are connected to two nuts 578. The light source 562 can have the same design and functionality as the lighting array described in reference to FIG. 2, including taking effectively subpixel-resolution full-color images.

In some implementations, the light source 562 is replaced by an LED or LCD display panel that can be used both as the light source for image capture and as a user interface, e.g., to display the results of the sample analysis, or other information.

In use, after the clamshell is opened, the top plate and lid can be lifted off the lift assembly and a sample can be placed on the surface of the sensor, for example, by a process described below. The lid plate together with the chamber lid can then be mounted on the lift assembly as described earlier. Next, the clamshell can be closed. The closing of the clamshell is detected turning on the high-power computational system. The computational system then drives the two actuators lowering the lift plate and allowing the exposed surface of the chamber lid to touch and settle down on the sample to form a predefined sample volume within a chamber between the exposed surface of the chamber lid and the surface of the sensor. After an image has been captured, the clamshell can be opened. The lid plate (including the lid) can be removed by lifting it from the four shafts. The lid can then be removed from the bracket and discarded or cleaned and reused, and the exposed sensor can be cleaned.

The previous section of this disclosure described a clamshell device implementation for imaging samples. The following section discusses implementations in which the sample is imaged while in a sample space defined by a light sensitive surface of the base assembly, a peripheral surface of the base assembly, and a surface of a lid, with a platform limiting contact between the sample and other portions of the device. Some implementations of the lid, base assembly, and platform are described. These implementations may be included in, for example, the handheld device described above and shown in FIGS. 1-2.

Figure 8:
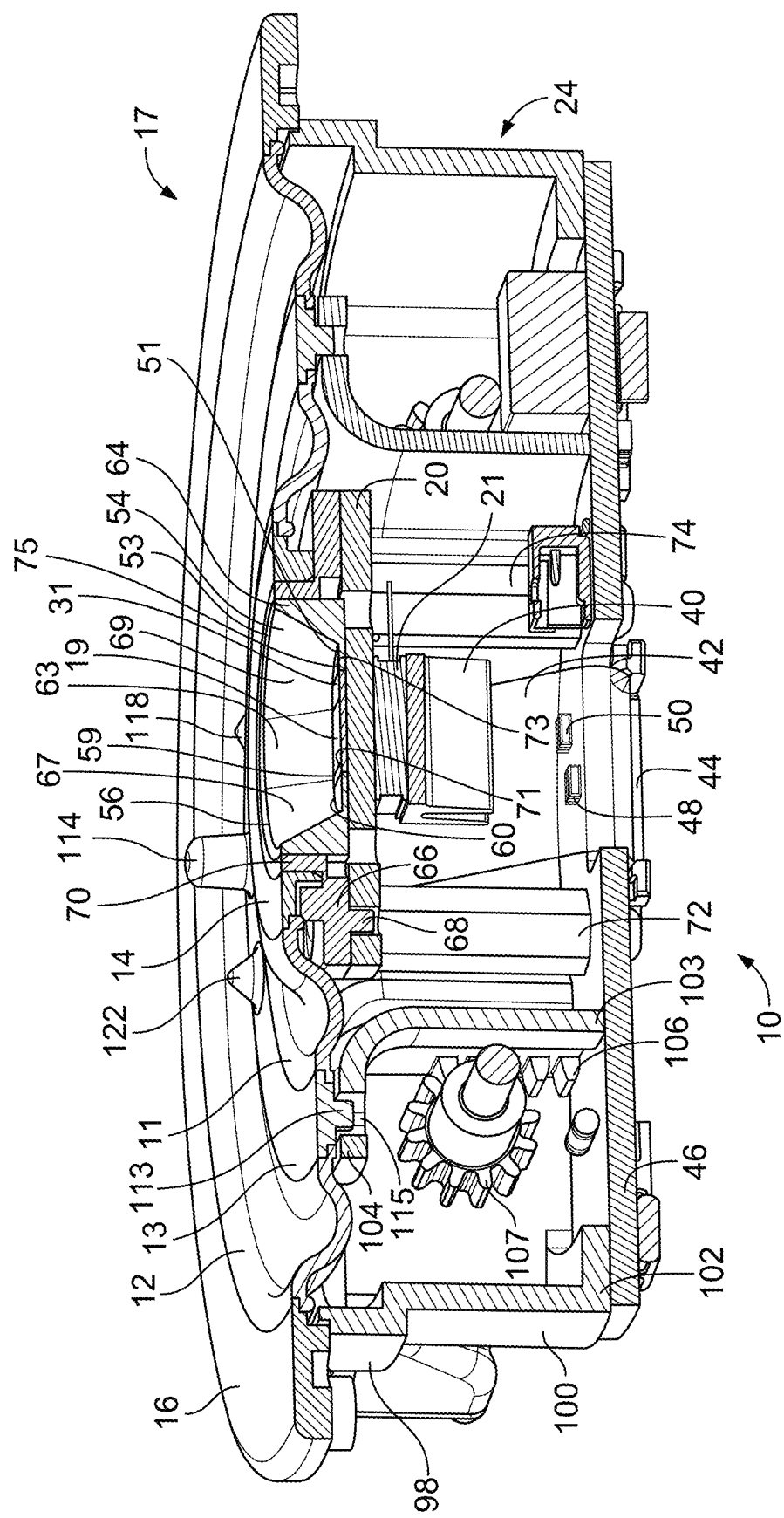
FIG. 8 is a perspective cut-away view of a platform on a device.

As shown in FIGS. 8 and 9A-9B, in some implementations, the platform 17 has an aperture through which a sample 27 (such as a small sample of blood drawn from a patient) to be imaged and containing elements 37 (such as blood cells of different types) to be counted, measured, or analyzed, for example, can be placed in contact with (e.g., on or near) a light sensitive surface 19 of a light-sensitive imaging sensor 31 mounted on one side of a sensor circuit board 20. A thermoelectric Peltier cooler 21 mounted on an opposite side of the circuit board is in contact with a heatsink 40. A sensor driving circuit 221 also on the circuit board enables signals to be sent between the sensor and other electronic components of the device. The sensor, the driving circuit, the circuit board, the cooler and the heatsink are part of the base assembly 24 of the device to which the platform 17 is attached. At the sensor surface 19 (FIG. 9B), an array 600 of light-sensitive elements 22 are exposed or covered by one or more thin layers, with their optical axes 602 directed normal to the surface 19 of the sensor 31 and away from the circuit board 20 in order to receive collimated light from a light source during imaging.

Figure 15:
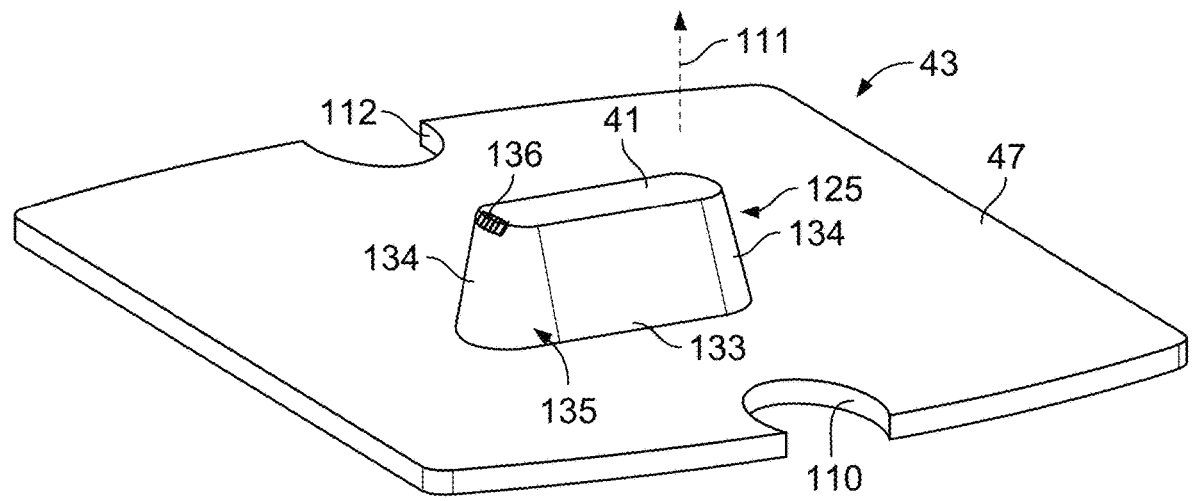
FIG. 15 is a perspective view of a lid.

A function of the platform 17 is to help to contain the sample within a sample space 39 and to reduce or prevent the sample contacting or contaminating the base assembly or any of its components (other than the sensor surface and, for example, the peripheral surface). The sample space 39 is bounded on a portion of one broad side by the sensor surface 19 and can be bounded on the opposite broad side by a combination of a lid surface 41 and a well surface 135, both of which are surfaces of an at least partially transparent lid 43 (FIGS. 9A and 15). In some implementations, the lid surface 41 is a stadium-shaped surface that directly faces the sensor surface, and the well surface 135 is a multifaceted surface (FIG. 15) adjacent to and attached to the lid surface 41. Both surfaces together can be inserted into the aperture prior to sample imaging.

The sample space can be divided conceptually into two sub-spaces. One sub-space of the sample space, an imaging space 32, is, for example, rectangular or approximately rectangular, bounded on one broad side by the sensor surface 19 and on the opposite broad side by the lid surface 41, and has the same length and width as the sensor surface 19. The imaging space 32 may be as thin as a monolayer of sample material, depending on the distance between the sensor surface 19 and the lid surface 41 when the imaging occurs. At the edges between those surfaces 19, 41, the imaging space 32 is not bounded by physical barriers. Rather, elements 37 of the sample are generally free to move between the imaging space and the remainder of the sample space, which is here called the well space 33. In some implementations, the area of the sensor surface 19 is greater than the corresponding opposite area of the lid surface 41 after the lid surface 41 has been brought close to the sensor surface 19. In that case, the breadth of the imaging space 32 is defined by the sensor surface 19, and its thickness is the distance between the sensor surface 19 and the lid surface 41.

The lid surface 41 and well surface 135 are placed within the aperture after the sample has been placed in contact with (e.g., on or near) the sensor surface 19, and so the imaging space 32 can have a thickness that depends on the distance between the lid surface 41 and the sensor surface 19. In the absence of a lid surface 41, the imaging space has a thickness defined by the distance of the upper surface of the sample from the sensor surface 19.

The sample space 32 lies within and is also bounded along a portion of its peripheral edges by a peripheral surface 54 of the base assembly 24. As shown in FIGS. 8-12, the peripheral surface 54 is oblique to and extends between an elongated boundary 56 on a surface of the base assembly 24 and a coaxial elongated boundary 60 on an opposing surface of the base assembly 24. The elongated boundary 56 is larger than, the same shape as, and has the same orientation as the elongated boundary 60. Each of the elongated boundaries is formed of two half circles 51, 53 joined by two straight lines 59 (only one shown). The peripheral surface therefore is formed of two oblique rectangular surfaces 63 joining two semi-conical surfaces 67, 69.

The two lines 59 bound two opposite parallel sides of the imaging sensor. The other two, parallel sides of the imaging sensor 71, 73 are bounded by edges of a floor 75 of the aperture, the floor 75 lying in the same plane as the sensor surface 19. As shown in FIG. 9A, when the lid surface 41 is in a position close to the sensor surface 19, gaps remain between the aperture floor 75 and the well surface 135 and the lid surface 41, and also between the peripheral surface 54 and the well surface 135. Collectively, these gaps make up the well space 33. Sample overflow (that is, portions of the sample in excess of the volume needed to fill the imaging space 32), pushed out of the imaging space 32 by the descending lid surface 41, can accumulate in the well space 135, which can be thought of as a reservoir of sample elements 37 that are not currently being imaged.

As shown in FIG. 9A, once the sample 27 has been confined to the sample space, the imaging sensor can be driven by the driving circuit to produce image data 204 representing a two-dimensional image of the portion of the sample that lies within the imaging space 32 and of the elements in the sample. The image data 204 can then be processed or analyzed by computer hardware 244 located, for example, in the housing 230 containing the base assembly 24. Image data can alternatively be processed or analyzed at a remote server to which data can be sent through a communication network, at a mobile or other device 212 that is local to the imaging device, or combinations of them. After image data have been acquired and processed or analyzed, the lid can be removed to expose the sample, the sensor surface can be cleaned, another sample can be placed in the sample space, and the process can be repeated. The lid can be designed to be disposable or single-use, thus obviating the need to clean it after imaging. Although the description here often refers to liquid samples, in some implementations, non-liquid samples, such as dry samples or gels or emulsions, could be processed in the device.

The sensor surface 19 or the lid surface 41 or both can be coated in hydrophilic coatings to promote sample retention. Surfaces in the vicinity of the sample space, like the upper surface of the rigid section 14 (FIG. 11), the aperture floor 75, and/or the peripheral surface 54, can be coated in a hydrophobic coating to reduce the retention of portions of the sample on those surfaces. The hydrophobic coating can also cause the sample to bead, reducing sample drying.

Figure 11:
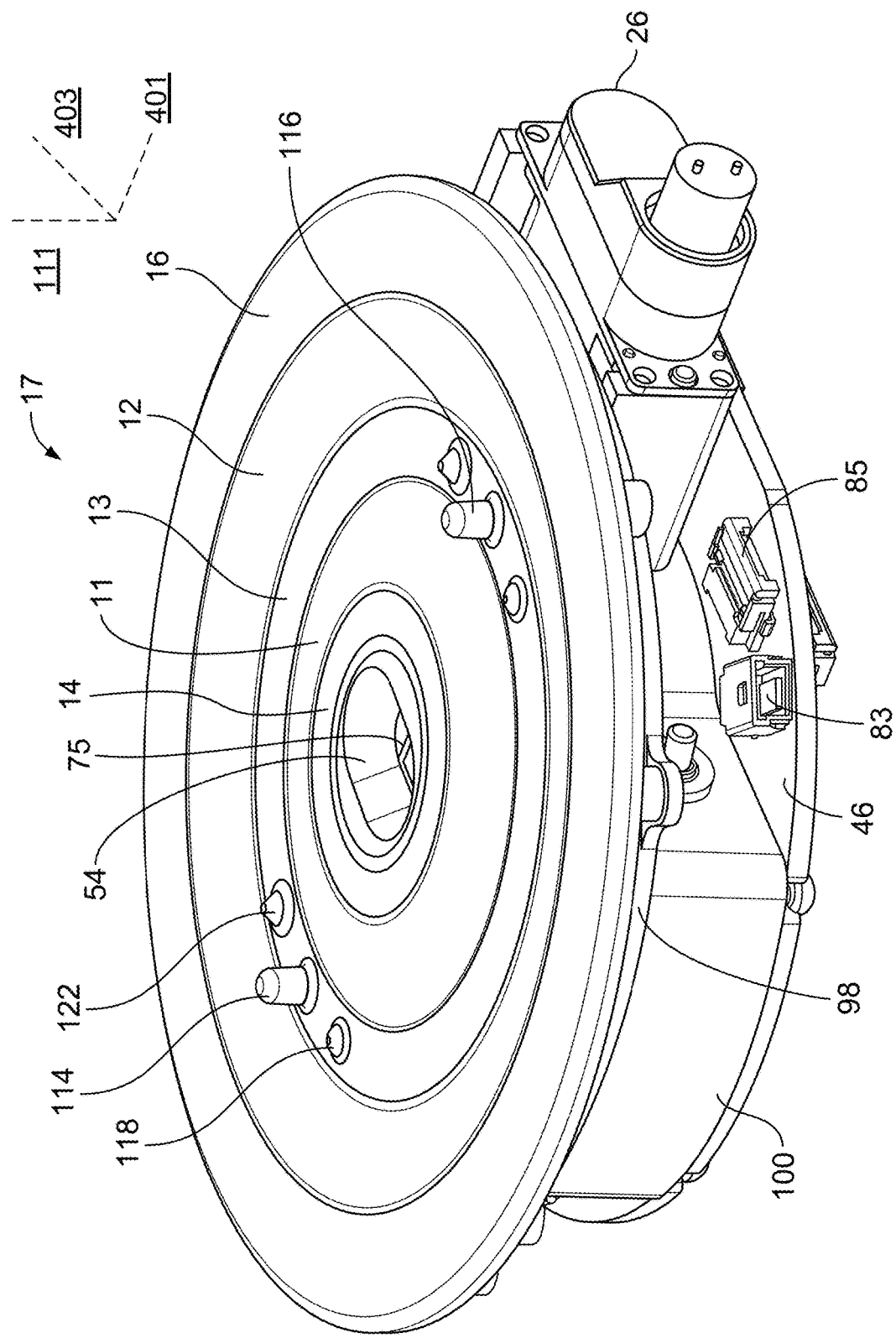
FIG. 11 is a perspective view of a platform on the device.
Figure 12:
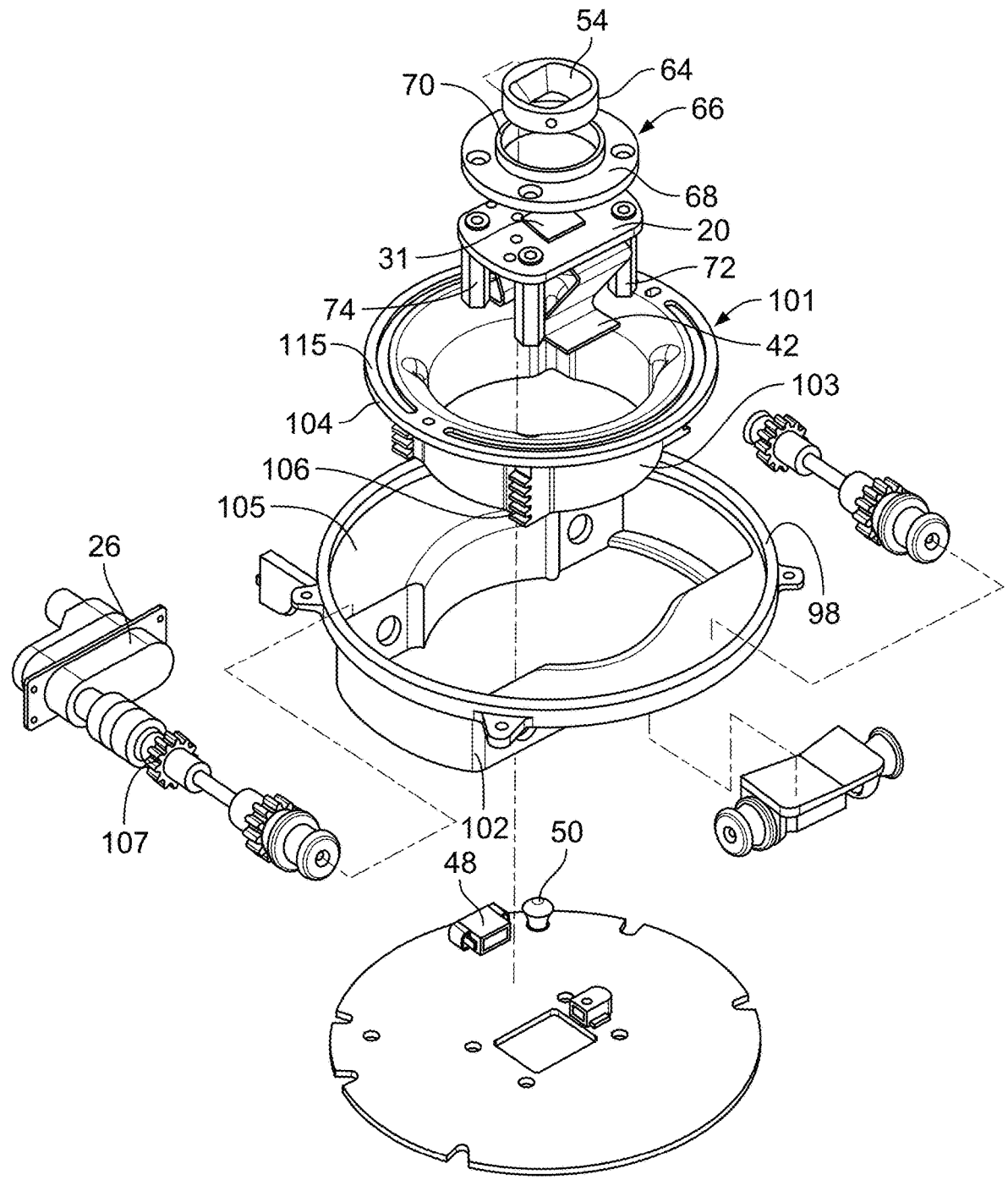
FIG. 12 is a perspective view of a base assembly.

When the sample is placed on the sensor surface, while the imaging is proceeding, and when the sample is cleaned away from the sensor surface, the sample or cleaning fluids could tend to leak beyond the aperture and to contact or contaminate components of the base assembly. To reduce or prevent such contact or contamination, the platform 17 and its connection to the base assembly are configured to form a fluid-tight seal that extends from the aperture to the outer wall 100 of the base assembly 24 (FIGS. 8 and 11).

The platform 17 is structured not only to provide a seal against contamination of components of the base assembly 24, but also to serve other functions in connection with the functioning of the lid to constrain and in some cases mix the sample within the sample space after the sample has been placed on the sensor surface. For these purposes, among others, the platform and the base assembly have features that enable precise positioning and orientation of the lid in three dimensions relative to the base assembly, tilting of the lid, and precise motion of the lid toward and away from the sensor surface.

For example, in some applications of the imaging device, it is useful to constrain a thickness of the imaging space 32 to be small, for example, no thicker than a monolayer of blood cells in a blood sample, for imaging and then counting of different kinds of elements in the blood sample. Because the number of elements 37 of each type in a thin layer of the sample may be too small to provide a statistically valid representation of the frequency with which such elements appear in a larger sample, it can be desirable to remix the sample after it is imaged to change the constituent elements of the portion of the sample in the imaging space 43, then reimage, and then process the counts of elements in the multiple images as if they were a single image as a way to improve the statistical accuracy. When the sample is placed on the sensor surface, any excess portion of the sample that cannot fit within the imaging space 32 can spill into the well space 33 that extends from the ends of the sensor surface. The additional volumes of sample represented by the spilled portions can be used in the remixing (which is effectively a resampling) process, which can be done repeatedly. More information about resampling can be found in U.S. Pat. No. 9,518,920, the entire contents of which are incorporated here by reference. The resampling can be accomplished by raising and lowering the lid, thus allowing or causing or both additional mixing of elements 37 between the imaging space and the well space. However, the mixing process would tend to contaminate components of the base assembly 24 except for the seal provided by the platform 17 and its connection to the base assembly 24.

The thickness of the imaging space can be set by spacing elements (for example, microbeads of precise diameter included in the prepared sample) that have the effect that, as the lid surface 41 eventually reaches a distance from the surface 19 of the sensor that corresponds to the size of the spacing feature, the spacing feature resists any further downward motion of the lid. In some implementations, the sample is a blood sample, and the spacing feature has the effect that only a precise monolayer of the blood sample having precise dimensions (the length and width of the sensor surface and the thickness of the spacing feature, and therefore a precise known volume for use in analysis of the images of the sample) remains in the space between the lid and the exposed surface 19 of the imaging sensor.

Among the features of the platform and the base assembly that, in various implementations, can enable precise positioning of a lid in three dimensions relative to the base assembly and precise motion of the lid toward and away from the sensor surface to, among other things, constrain and mix the sample are the following:

In some examples, the base assembly and the platform are round or have round features, and, as shown in FIG. 11, the platform 17 is formed of an assembly of concentric round platform segments that include two pliant portions 11, 12 and three rigid platform segments 13, 14, 16 between which the pliant portions 11, 12 are interleaved as shown. Each of the pliant portions 11, 12 can be made of silicone or another elastomer that is known to be resistant to samples (e.g., will not absorb a fluid sample such as blood) and to cleaning and disinfection agents, is flexible and resilient, and can be mounted to and sealed to the adjacent rigid platform segments. For example, the pliant portions 11, 12 may be made of a material that is resistant to high-level disinfectants, intermediate-level disinfectants, low-level disinfectants, and/or sterilants, As shown in FIGS. 8 and 10-12, the outer rigid platform segment 16 is connected to and sealed to one flange 98 of a rigid annular outer wall 100 of the base assembly. Another flange 102 of the annular outer wall is attached to the microcontroller circuit board 46, and both flanges 98, 102 are portions of a base frame 105 that remains fixed in position as a movement mechanism 101 moves up and down. The outer peripheral edge of the pliant portion 12 is sealed to the inner peripheral edge of the platform segment 16 and the inner peripheral edge of the pliant portion 12 is sealed to the outer peripheral edge of the rigid platform segment 13. Similarly, the outer peripheral edge of the pliant portion 11 is sealed to the inner peripheral edge of the platform segment 13 and the inner peripheral edge of the pliant portion 11 is sealed to the outer peripheral edge of the platform segment 14. The peripheral surface 54 is formed as an inner surface of an annular sleeve 64 that is held on the sensor circuit board 20 by an annular mount 66 having a cylindrical central portion 70 and a flange 68 that is mounted on the sensor circuit board 20. The sensor circuit board 20 is mounted on and spaced from the microcontroller circuit board 46 by posts 72, 74. Based on this structure, the platform 17 is generally suspended between its outer periphery which is mounted on the base assembly 24 and its inner periphery which is also mounted on the base assembly 24. Because a significant part of their function is to attach the platform to the base assembly, the platform segments 14 and 16 can be referred to as attachment portions of the platform.

The rigid platform segment 13, in contrast to segments 14 and 16, is not connected in a fixed position relative to the base assembly but is held on the base assembly 24 by a movement mechanism 101 that enables the segment 13 to be moved toward and away from the microcontroller circuit board 46 under control of a microcontroller 48 mounted on that circuit board to position the lid and move it back and forth to form a portion of the sample in the imaging space and remix it as described earlier. Because it functions to move the lid, the platform segment 13 can be referred to as the movement portion of the platform.

Figure 13:
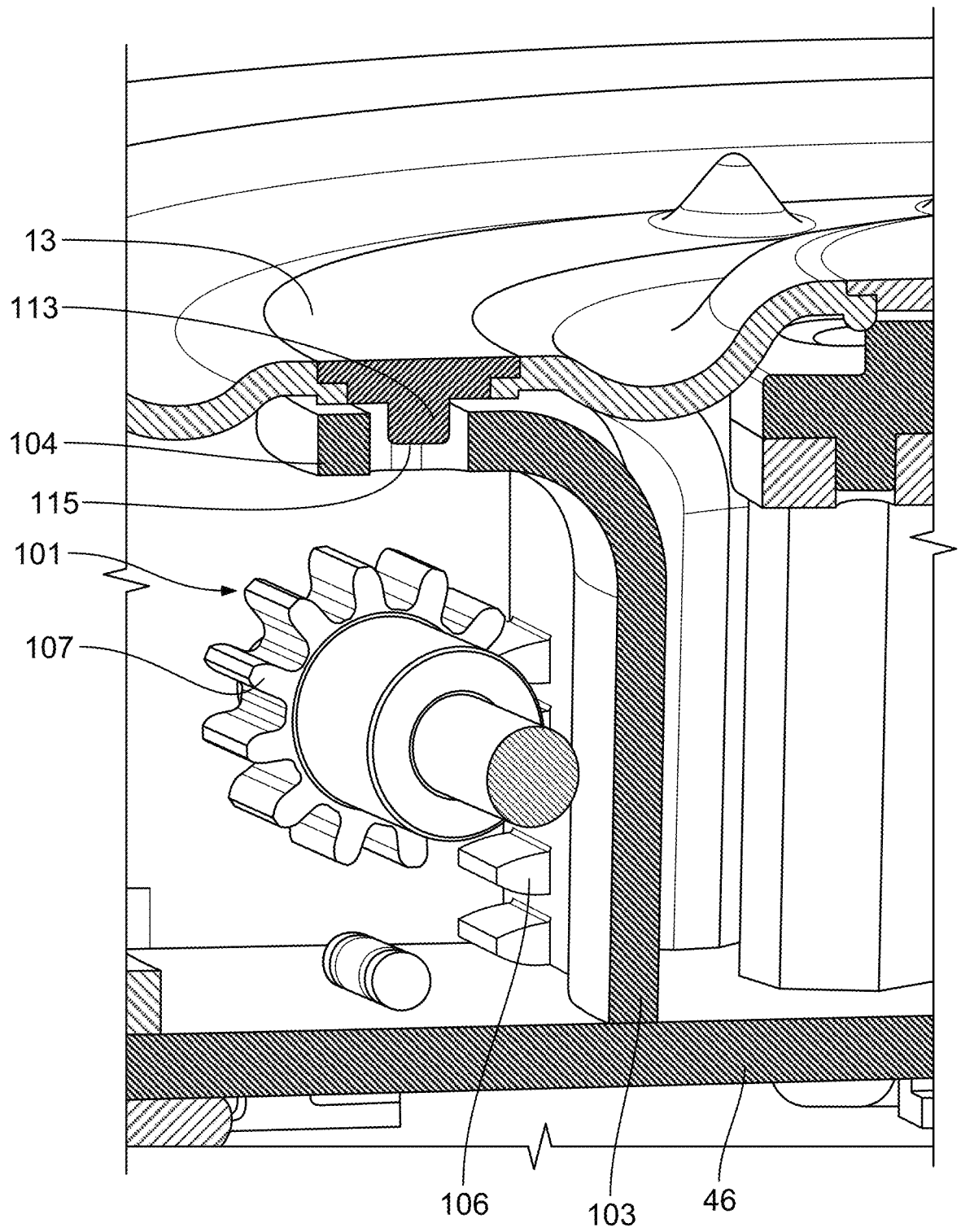
FIG. 13 is a perspective enlarged cut-away view of a portion of a platform on a device.

The movement mechanism 101, shown in FIG. 13, includes an annular support 103 having an outwardly extending flange 104 to which the segment 13 is attached. On opposite sides of the outer cylindrical surface of the support are two racks 106 of teeth (one shown in FIG. 13) that can be driven by pinions 107 to cause the segment 13 to move away from and toward the microcontroller circuit board 46. A motor 26 such as a servomotor can drive the two pinions 107 to move the segment 13 toward and away from the microcontroller circuit board 46. The movement mechanism 101 can move at a chosen velocity and through a range of positions controlled by the microcontroller circuit board 46. Bottom ridges 113 on the underside of the segment 13 fit into sockets 115 on the top of the extending flange 104 in order to hold the segment 13 in place and align it with the base assembly 24.

Figure 14A:
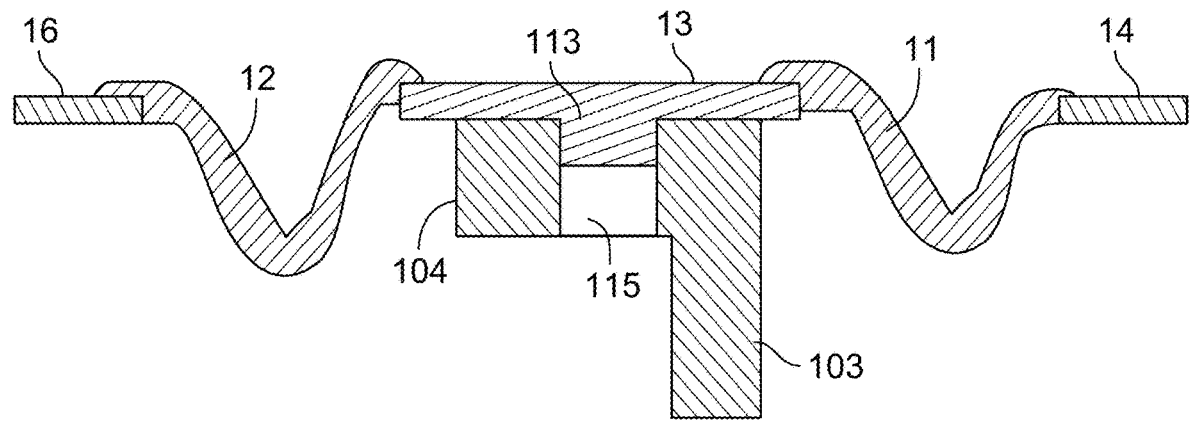
FIG. 14A-14B is a side view of a portion of a platform on a device.
Figure 14B:
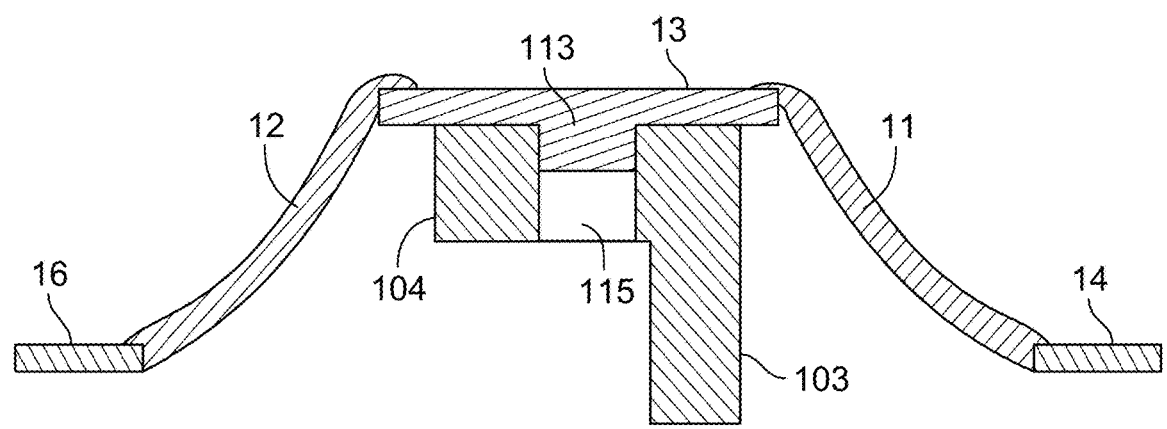

The two pliant portions 11, 12 can be configured to be flexible and resilient or to include excess material or both, to accommodate motion of the segment 13 relative to the segments 14 and 16. For example, as shown in FIG. 14A, the pliant portions 11, 12 may include more material than is necessary to bridge the gaps between rigid segments when the segment 13 is planar with the other segments 14, 16. When the segment 13 is moved away from the base assembly 24 and out of the plane of the segments 14 and 16, as shown in FIG. 14B, the pliant portions include enough material to accommodate that motion.

In some applications, it is important that the lid 43, shown in FIG. 15, be accurately positioned linearly along each of the X axis 401 and Y axis 403 shown in FIG. 11 and rotationally about the axis 111 normal to the surface of the sensor. This precise positioning can be useful in forming a precise and known volume of a sample portion.

For this purpose, the lid 43 includes two cutouts 110, 112 that mate with two corresponding pins 114, 116 on the exposed surface of the segment 13. Once the sample has been placed on the sensor surface, the lid can be manually placed on the segment 13 with the pins inserted in the cutouts. The lid 43 itself can be a disposable piece of transparent, molded plastic, or another material.

In some implementations, the lid is aligned using bumps on the lid that face the base and platform. These bumps may, for example, be positioned in pairs. The bumps may engage and sit between corresponding rounded protrusions on the segment 13.

The lid surface 41 that bounds one broad side of the imaging space 32 lies on a face of a protruding element 125 extending from the body 47 of the lid 43 towards the sensor surface, as shown in FIGS. 9A and 15. In some implementations, as shown in FIG. 15, the protruding element 125 is a trapezoidal prismatoid with two bases of unequal sizes, the larger base in contact with the lid body 47, which is a wider body (e.g., a plate) from which the protruding element 125 protrudes. Two opposite faces of the prismatoid have arced edges adjacent to the bases, but their cross-sectional edge from one arced edge to the other is straight. The resulting overall shape of the protruding element 125 is that of a rounded prismatoid with two opposite, unequal-size, rectangular bases, two opposite, rectangular oblique faces 133, and two opposite, rounded faces 134, the four faces together making up the well surface 135. The smaller base of the protruding element 125, oriented to face the sensor surface, is the lid surface 41.

Figure 20:
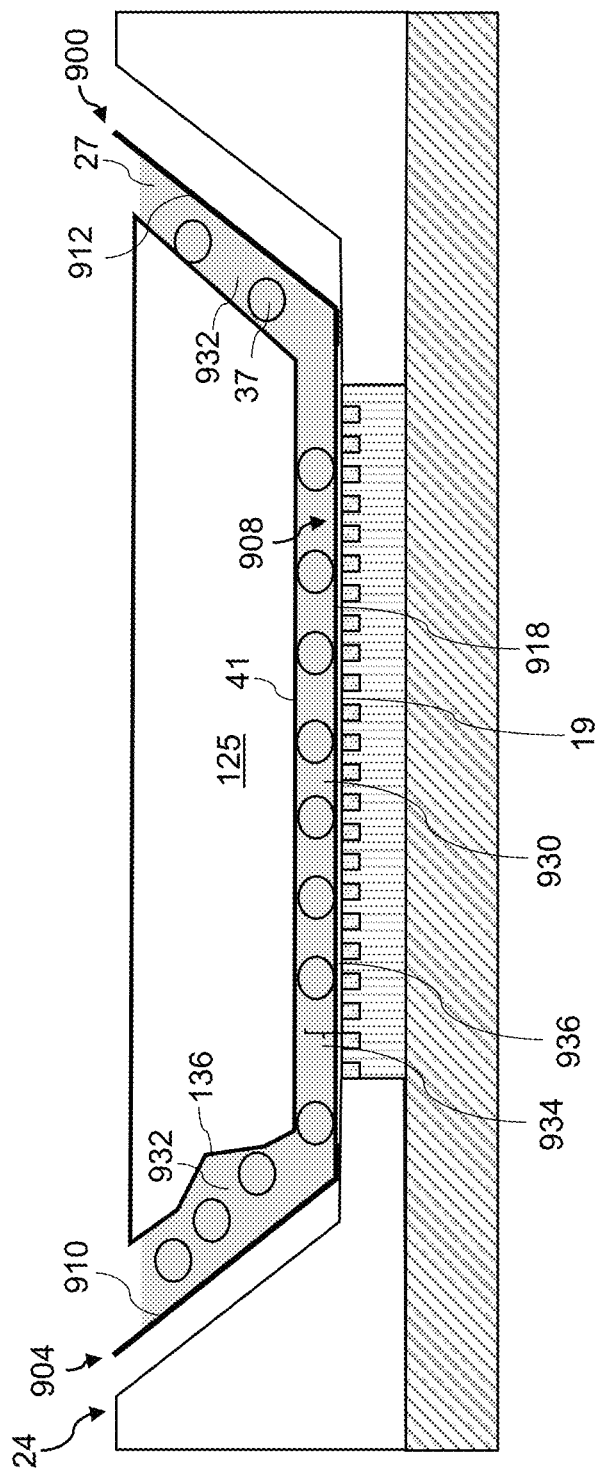
FIG. 20 is a schematic view of an imaging system including a cassette.

In some implementations, as shown in FIGS. 9B, 15, and 20, one or more edges of the protruding element 125 contain at least one notch 136 along at least one portion of their length. The notch cuts across the edge to create a cut-out of the lid surface 41 at the edge. In some implementations, two opposite edges include at least one notch 136. Portions of the sample may flow out of the imaging space via the one or more notches, for example, as the lid is moved toward and away from the sensor surface, or as the lid is moved toward the sensor surface before imaging. This may lead to more uniform sample mixing. In some implementations, a notch is positioned on an edge that is first to touch a sample as the lid is lowered towards the sample (e.g., because of a tilt imposed on the lid), because this edge may present an obstacle to the sample as the sample is pushed out from under the protruding element as the protruding element moves towards the sensor.

The protruding element 125 is sized and shaped to fit into the aperture and to have the lid surface 41 cover at least the sensor surface 19 without having the protruding element 125 contact any surface of the platform 17. The space between the lid 43 and the surfaces of the platform 17 (or, in greater detail, the combined vertical spaces between the floor 75 and the lid surface 41, between the floor 75 and the faces 133,134, and between the peripheral surface 54 and the faces 133,134) makes up the well space 33. The platform 17 and protruding element 125 can be designed so that the well space 33 can accommodate the entire overflow of the sample after the lid surface 41 has been brought close to the sensor surface 19.

In some implementations, the two rounded faces 134 have a curvature that matches the curvature of the semi-conical surfaces 67, 69 of the peripheral surface 54, such that, when the faces and the surfaces are positioned opposite each other, the gap between them has a constant thickness. Similarly, the two faces 133 can be positioned to face the oblique rectangular surfaces 63 and can be made parallel to those surfaces. The protruding element 125 is sized such that, even if the lid 43 is moved such that the lid surface 41 directly touches the sensor surface 19, the lid body does not come into contact with the platform 17.

In some implementations, the lid is initially caused to be tilted slightly (for example at an angle of three degrees, or at an angle within a range between one degree and ten degrees) relative to the segment 13 by the two shorter nipples 118 and the two longer nipples 122 arranged on the exposed surface of the segment 13. In some implementations, the lid is initially tilted relative to the sensor surface because the segment 13 includes features that are tilted relative to the sensor surface, e.g., a top surface of the segment 13 is tilted relative to the sensor surface, and the lid rests flat on the top surface, such that the lid is tilted relative to the sensor surface.

When manually placed on the segment 13, the lid 43 rests on the exposed surface of segment 13 but is not attached to the exposed surface. After the lid 43 is placed, the servomotor 26 can be controlled to drive the segment 13 towards the microcontroller circuit board 46. As the driving of the segment 13 continues, the lid surface 41 of the lid 43 eventually touches and causes the lid surface 41 to float on the sample. When, as in some implementations, the axis that extends from the center of the sensor surface is aligned with and opposite to the direction of gravity, an upward force opposing gravity causes the lid to slowly separate from and float above the segment 13. The tilt caused by the nipples 118, 122 can ensure that a particular edge of the protruding element 125 is the first to touch the sample. As the lid descends, the lid surface 41 of the lid 43 settles gradually onto the sample and, as it does so, re-orients itself from the slightly tilted orientation so that the lid surface 41 becomes parallel to the sensor surface to form, for example, a monolayer of the sample in the imaging space between the lid surface 41 and the sensor surface.

For re-mixing, the servomotor 26 can be controlled to move the segment 13 and therefore the lid 43 toward and away from the sensor circuit board once or repeatedly. For example, as the segment 13 rises, the segment 13 may re-engage with the lid 43 and the lid 43 becomes again supported by the segment 13. As a result, portions of the sample, including elements 37, in the well space will be drawn into and remixed with the sample in the imaging space, so that when the lid descends fully a different portion of the sample forms the monolayer of elements being imaged.

This process, besides causing resampling, can also mix the sample to ensure that the proportions of sample elements in the imaging space matches the proportions of those elements in the bulk sample. To aid in mixing, additional techniques can also be applied, such as vibrating the sensor or the lid or both at empirically determined frequencies.

During motion of the segment 13, the pliant portions 11 and 12 can accommodate to the motion for the reasons described earlier and continue to maintain the intended seal.

In some implementations, the lid is pre-treated with agents that are dried or otherwise disposed onto the lid surface 41. When the lid surface comes into contact with a portion of the sample, the agent mixes with the sample. Dissolution and diffusion of the agent in the sample can be assisted by the mixing process described earlier. Pre-treating the lid with dry agent can alleviate problems of dilution imprecision, limited agent shelf life, and requirements for cold storage often associated with use of liquid agents.

Pre-treating the lid can also allow for precise timing control in, for example, incubation steps, because incubation using a agent dried onto the lid will begin only when the lid surface is brought into contact with the sample, and the imaging process after that time can be automatically controlled. Feedback regulation of temperature in the sample chamber provides further precision in control of incubation. Agents including anticoagulants, diluents, microbeads, antigens, antibodies, enzymes, substrates, inhibitors, drugs and other compounds may be pre-applied to the lid. Further description of possible agents and their use in analyses is provided below.

To assist incubation, heat can be applied to, or removed from, the sample. The heating or cooling can be applied by heating elements located on the same sensor circuit board 20 that also bears the imaging sensor 31. The image sensor itself can supply heat. The heating or cooling elements can include, for example, the Peltier cooler 21. The sensor circuit board 20 can also include a temperature sensor, which may be incorporated in the image sensor.

As shown in FIG. 8, also part of the base assembly is a conductive cable ribbon 42 connecting the image sensor circuit board 20 to a circuit connector 44 mounted on the microcontroller circuit board 46 that also bears other electronic components like the motor microcontroller 48 and another component 50, for example. Additional connectors attached to microcontroller circuit board ports 83, 85 (FIG. 11) can connect the microcontroller circuit board 46 to computer hardware 244 (FIG. 9A), which in turn can be connected to a user device 212 or operated directly by a user 208 using a display device 240 such as a touchscreen. As shown in FIG. 9A, signals and data 204, 206 can be transferred between the sensor circuit board, the microcontroller circuit board, and the computer hardware. For example, the computer hardware can receive information 206 (e.g., commands) from the user 208 via a touchscreen 240, process the received information 206, and transmit the received information 206 to the microcontroller circuit board 46. A similar sequence of operations can control the motor 26, starting or stopping its motion and regulating its speed and distance traveled. In addition, the computer hardware 244 can receive data 204 (e.g., sensor data from the image sensor 31) from the microcontroller circuit board 46, process the received data 204, and display the received data 204 to a user.

In some cases, the computer hardware can apply a neural network or other machine learning model to classify elements of a sample.

In some implementations, the imaging device can include self-check features meant to enable more accurate and reliable measurements. Self-check features can enable the device to be used by users with little or no specialized training.

In some implementations, a self-check feature is automated detection of undesired sample element movement during imaging. If elements within a sample move during an imaging sequence, elements may be misclassified or misidentified. To detect sample element movement, the device can include (for example, as part of the lighting array on the circuit board 306 in FIG. 2) specialized lighting elements designed to enable detection of particular elements. For example, the specialized lighting elements could include a 405 nm-emitting LED to enable accurate hemoglobin detection. In some implementations, a specialized lighting element, having a wavelength corresponding to a high absorbance of a particular element, may be included even if the specialized lighting element is not used in a self-check procedure.

An imaging sequence by the device can be analyzed, for example, comparing the first and last images to check for blood cell movement during imaging. If movement above a threshold movement value is detected, all images can be discarded. In some implementations, images used for movement detection may be taken using the specialized lighting element.

Element movement can be detected based on, for example, overlap between elements in the first image and elements in the last image. If the ratio of area of overlap to total area is below a certain amount, for example, below 75%, then all images between the first image and the last image can be discarded.

In some implementations, a self-check feature is automated detection of artifacts in images. For example, the imaging device can detect debris, for example, fibers, within the imaging space. The imaging device can detect defects in the imaging sensor, for example, bad pixels or lines of bad pixels. The imaging device can detect clumps of spacer beads, platelets or other sample elements. The imaging device can detect spacer beads that are too large and that would cause the lid surface to be too far from the imaging sensor. The imaging device can calculate the density distribution of sample elements across each image and search for non-uniformities, which might indicate, for example, a tilted sensor or a tilted lid.

When a self-check process indicates an imaging problem, one or more operations may be carried out in response. For example, an alert can be provided to a user, and/or mixing and imaging operations may be repeated.

Figure 16A:
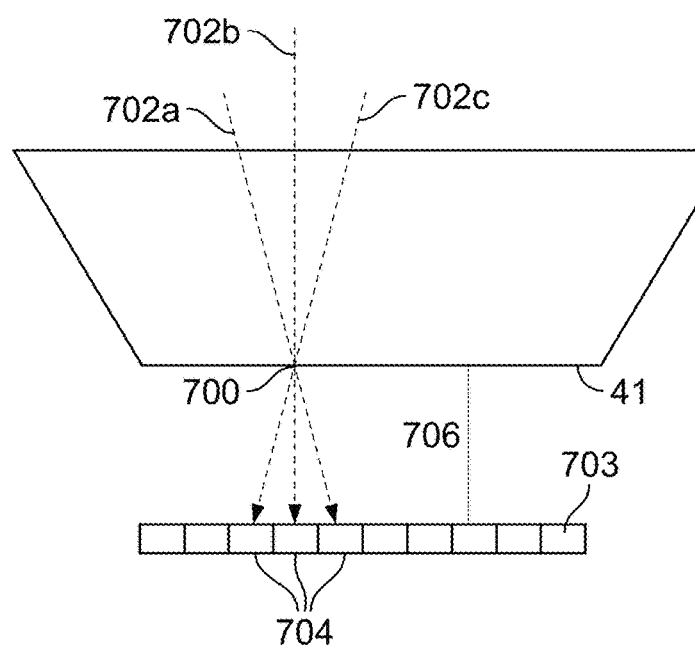
FIG. 16A is a side view of light passing through a mark on a lid.

In some implementations, a self-check feature is automated detection of lid surface height above the image sensor. As shown in FIG. 16A, the lid surface 41 might include a mark 700, for example, a mark with a defined, sharp corner, such as an "L"-shaped mark. The mark 700 can be in the path of light 702a, 702b, 702c coming from a lighting array and thus be visible in images taken using the imaging sensor 703. Because, as described above, light from different portions of the lighting array can reach the imaging sensor 703 at different points (for example, at different pixels 704 of the imaging sensor), the imaging device can perform triangulation using the mark 700 on the lid surface 41 to calculate the height 706 of the lid surface 41 above the image sensor 703.

In some implementations, a self-check feature is automated detection of lid height using compliant beads. As shown in FIG. 16B, before the lid 43 including the lid surface 41 is brought down upon an imaging sensor 703 having a compliant bead 708 upon it, the compliant bead 708 is spherical. The compliant bead 708 can have a known original size 710, for example, a diameter. When the lid surface 41 is brought down as shown in FIG. 16C, the compliant bead 708 is partially flatted and now has a new effective size 712 as viewed from and detected by the imaging sensor 703. The difference between the known original size 710 and the new effective size 712 can indicate an amount of compression of the bead 708, and the device can thus calculate the height of the lid surface 41 above the imaging sensor 703.

Based on the detected lid height, the lid height can be adjusted and/or zeroed/calibrated.

In some implementations, a self-check feature is automated imaging sensor cleanliness checks. Before a sample is placed onto the imaging sensor, or after a cleaning of the imaging sensor, the device can take an image with no sample on the imaging sensor. The image should indicate a clean imaging sensor, for example, the image should show few or no cells on the imaging sensor and little or no debris on the imaging sensor. If the imaging sensor is not clean, the device can display an alert for a user. In some implementations, the device may make analysis results (after imaging and analysis) inaccessible until the user has satisfactorily cleaned the device, in order to incentivize immediate cleaning of the imaging sensor after use.

We have described different kinds of implementations of an imaging device among a broad range of other possible implementations. Features described as part of each of the different kinds of implementations can be incorporated in or otherwise combined with features of the other kind of implementations. For example, such features can include spacing features, imaging techniques, data analysis and processing, resampling by repeatedly moving the lid in reference to the imaging sensor, and others. Moreover, relative dimensions, shapes, mechanical implementations and arrangements, and other features described herein with respect to the imaging devices are exemplary and non-limiting.

The system as a whole can enable useful imaging and measurements of various fluid and dry samples. For example, it is suited to imaging, detecting and analyzing types of cells in blood, counting cells of various types in blood, determining the normality of cells in blood, monitoring the function of cells in the blood, and analyzing the chemistry of blood.

Figure 17A:
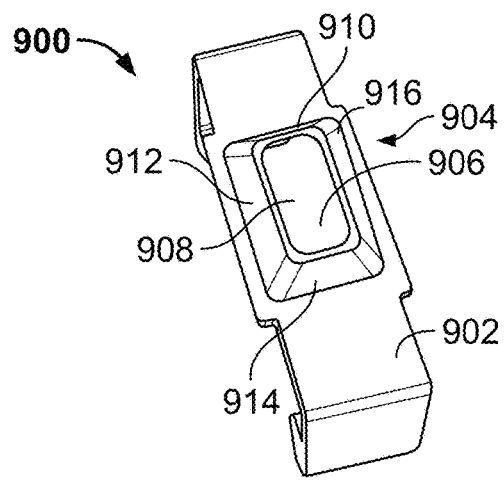
FIGS. 17A-17C are perspective views of a cassette.
Figure 17B:
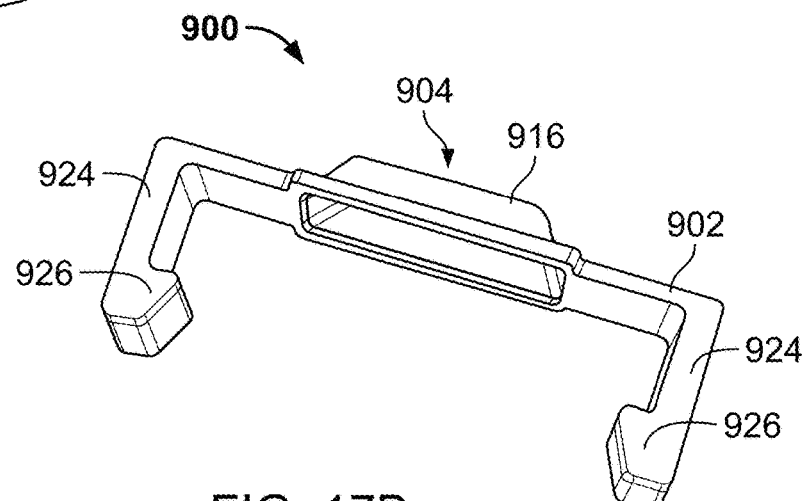
Figure 17C:
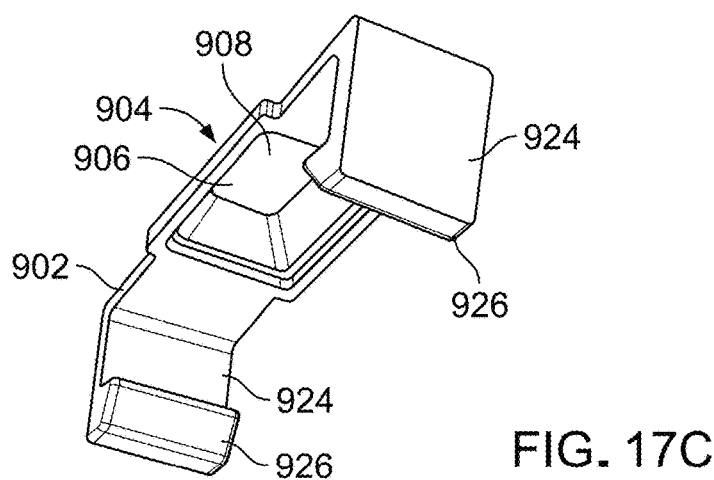

In some implementations, the device includes a disposable sample cassette 900, as shown in FIGS. 17A-17C. The cassette 900 includes a cassette frame 902, the cassette frame 902 including a protruding window 904 defining a cassette aperture 906. A transparent thin film 908 covers the aperture 906 on an outer side of the protruding window 904. Opposite faces of the thin film (e.g., bottom surface 918 and an opposite top surface) are at least partially exposed. Various configurations of the cassette are within the scope of this disclosure; the following figures show a cassette according to some implementations.

Outer faces of the four sidewalls 910, 912, 914, 916 (shown in FIGS. 17A-17B) of the protruding window 904 form a truncated pyramid and are sized to match corresponding faces of the peripheral surface 54 of the base assembly with a bottom surface of the transparent thin film 908 in place, for example, on top of the sensor surface 19 of at least some implementations described earlier. In some implementations, the protruding window 904 can have other shapes, e.g., to match different shapes of the peripheral surface 54. The protruding window 904 is oriented in position so that the thin film 908 is in contact with, or very close to, the sensor surface 19 (for example, at a distance from the sensor surface that is less than 20 nm, or that is less than 50 nm, or that is less than 100 nm, or that is less than 200 nm, or that is less than 500 nm).

Figure 18:
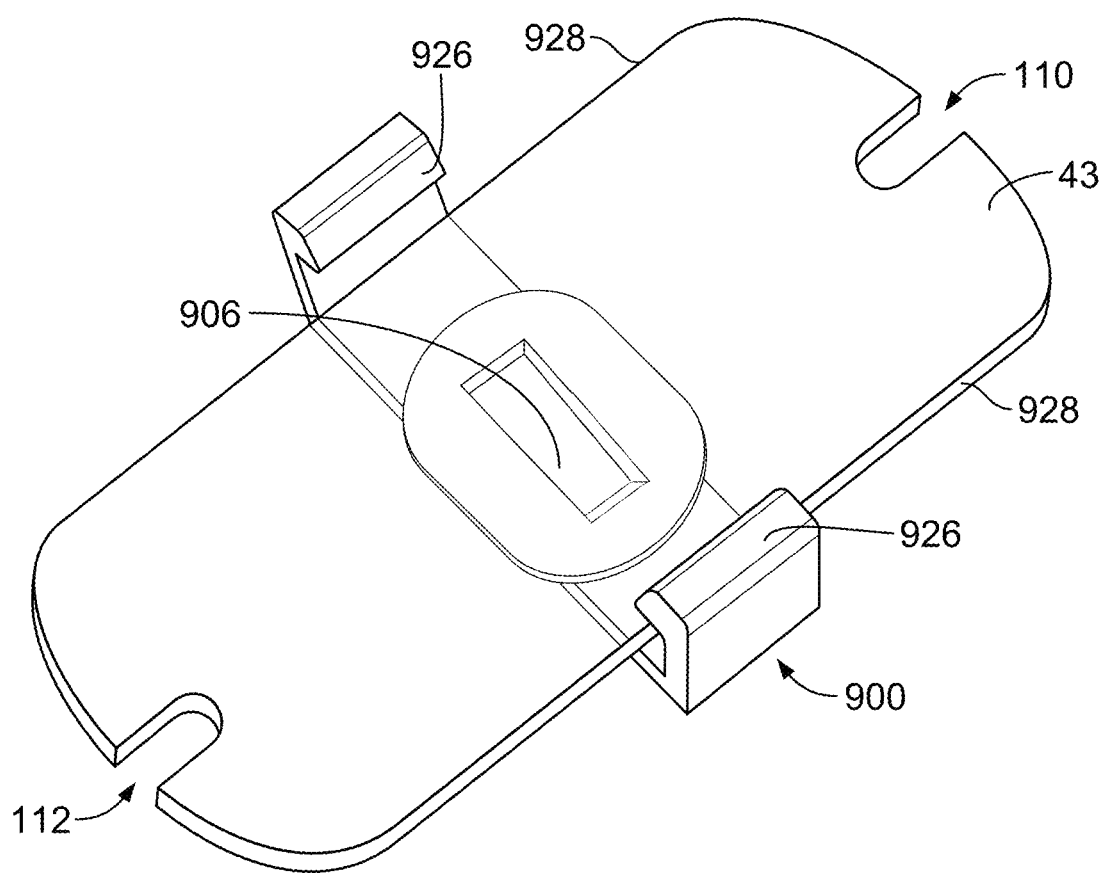
FIG. 18 is a perspective view of a lid on a cassette.
Figure 19:
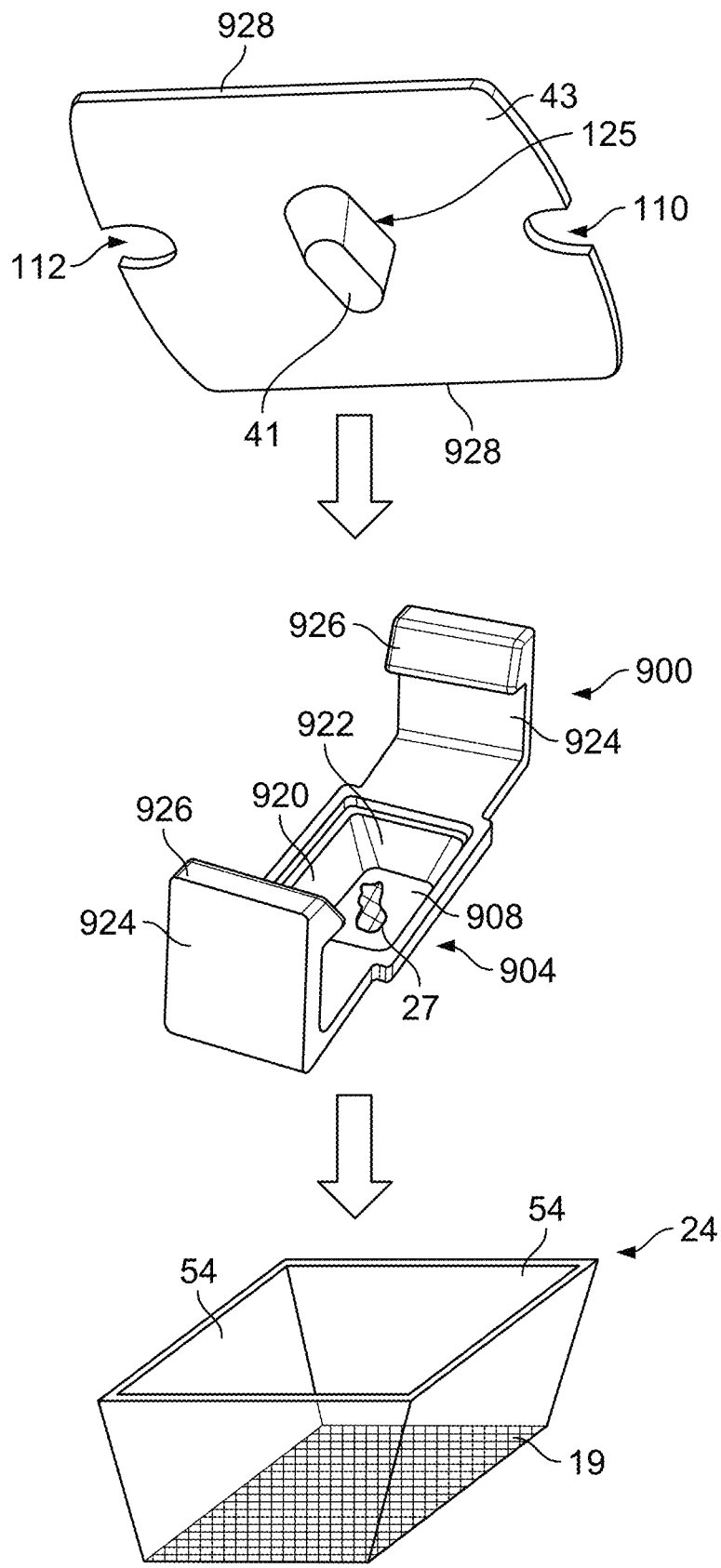
FIG. 19 is a schematic view of placing a lid and a cassette on a sensor surface.

The cassette 900 may be configured (for example, sized and shaped) to receive a lid 43 bearing a lid surface 41, as shown in FIGS. 18-19. The inner faces (e.g., inner faces 920, 922 of FIG. 19) of the sidewalls of the protruding window 904 may be sized and shaped to match or otherwise receive a protruding element 125 of the lid 43. The aperture 906 may be sized and shaped to match the lid surface 41, and either or both of the aperture 906 and the lid surface 41 may be sized and shaped to match the sensor surface 19.

The cassette 900 may take other shapes and configurations. In some implementations, the cassette 900 does not include the protruding window 904, and the thin film 908 covers a cassette aperture 906 defined directly by a substantially planar cassette frame. In some implementations, the thin film 908 covers the aperture 906 on an inner side of the protruding window 904. In some implementations, the cassette aperture 906 is defined by a window having a different shape, e.g., a concave window extending away from the sensor surface 19.

The cassette 900 may include engaging structures to hold the lid 43 in place. For example, as shown in FIGS. 17A-19, in some implementations the cassette 900 includes two resilient arms 924 terminating in spring clips 926. The clips 926 engage edges of the lid 43 (for example, the edges 928 indicated in FIGS. 18-19) when the lid 43 is pushed into the cassette 900 with the protruding element 125 fitting into the protruding window 904 of the cassette 900. When the clips 926 are engaged, the lid 43 can carry the cassette 900, allowing a user to efficiently remove both the lid 43 and the cassette 900 at the same time by lifting up on the bottom of the lid 43. When captured by the clips 926 of the cassette 900, the lid 43 is free to move vertically, with respect to the cassette 900, within a range defined by the configurations and sizes of features of the lid 43 and the cassette 900, including the clips 926 and the frame 902.

FIG. 18 shows the lid 43 mated with the cassette 900. As described above, the lid 43 includes cutouts 110, 112 that mate with corresponding pins on an exposed surface of a platform, e.g., a movement portion of the platform that may agitate the lid 43 towards and away from the thin film 908 within the defined range.

Figure 21:
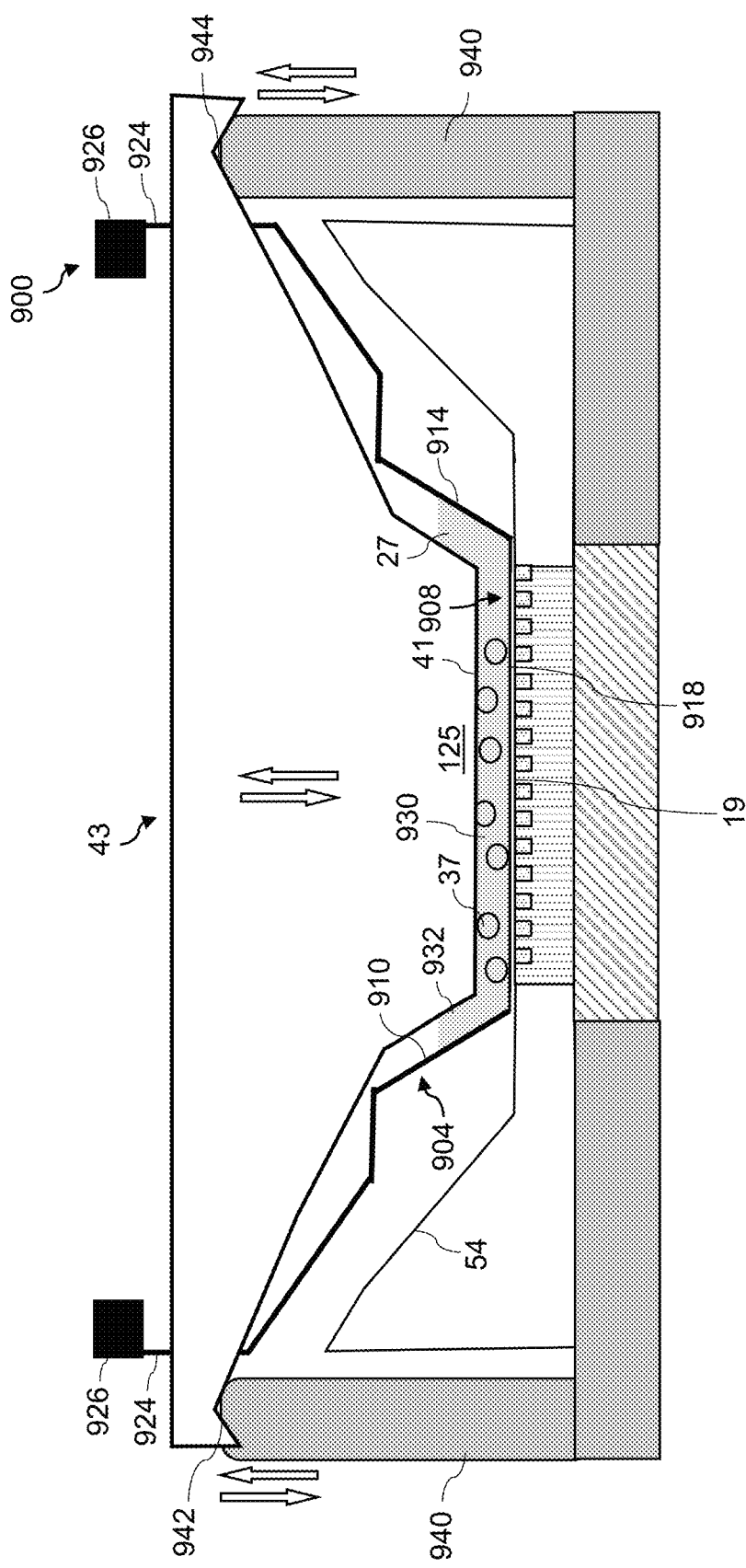
FIG. 21 is a schematic view of an imaging system including a cassette.

In use, as shown in in FIGS. 19-21, a bottom surface 918 of the thin film 908 of the cassette 900 is placed on the sensor surface 19 by fitting the projecting window 904 within the base assembly 24. A sample 27 to be imaged, the sample containing sample elements 37, is then placed on the thin film 908 (on an opposite surface to the bottom surface 918) by means of, for example, a pipette. With the sample 27 on the thin film 908, the lid 43 is pushed against the angled upper surfaces of the clips 926, causing the resilient arms 924 to spread apart and allow the lid 43 to pop into position over the sample 27 to define an imaging space 930 between the lid surface 41 and the thin film 908 such that at least part of the sample is held within the imaging space 930, with the protruding element 125 of the lid 43 fitting at least partially inside the projecting window 904. Excess portions of the sample 27 are pushed into a well space 932 defined between the sidewalls 910, 914 and the lid 43. In some implementations, the sample 27 is placed on the thin film 908 before the cassette 900 is positioned on the sensor surface 19. In some implementations, the lid 43 is placed over the sample 27 before the cassette 900 and lid 43 are positioned on the sensor surface 19.

Note that FIG. 20 shows a profile cut through a center of the protruding element 125 of the lid, such that notch 136 is visible along an edge of the protruding element 125.

As shown in FIGS. 20-21, the peripheral surface 54 of the base assembly 24 and the outer faces of the sidewalls 910, 912 of the protruding window 904 are shaped and sized such that the thin film 908 may be placed fully on the sensor surface 19.

With the sample, the cassette, and the lid in place as described, imaging and mixing functions may be carried out as previously described. The lid may be placed in contact with the sample and moved to mix the sample or to define a thin film of the sample. A device including the cassette 900 can also include the features shown in FIGS. 1-16C.

For example, as shown in FIG. 21, which shows a cassette 900, lid 43, and sensor surface 19 at a different scale than in FIG. 20, the lid 43 is substantially free to move, e.g., be moved by a movement portion 940 of a platform that engages with the lid 43 at engaging points 942, 944. The lid 43 is attached to the cassette 900 using the spring clips 926 on top of the arms 924. As indicated by the arrows in FIG. 21, the lid 43 can move up and down within a defined range without causing movement of the cassette 900, the range being defined on one end by the clips 926. The lid 43 is moved with respect to the cassette 900 and the sample 27 on the thin film 908, and therefore causes mixing of sample elements (e.g., into and out of the well space 932). The lid 43 comes to rest parallel to the sensor surface 19. In the implementation shown in FIG. 21, the protruding window 904 of the cassette 900 rests adjacent to the sensor surface 19.

In some implementations, the lid 43 is supported by a platform or a base of the device, and the cassette 900 is attached only to the lid, without any direct support from the platform or base. In some implementations, the cassette 900 is configured to be supported by the platform or base. For example, the cassette 900 (e.g., the thin film 908, the protruding window 904, or the cassette frame 902) may be supported by the sensor surface 19 or by another portion of the base or platform. The cassette 900 may include mating features such as recesses or protrusions that align with corresponding features in the platform or the base to support the cassette.

A thin sample layer (e.g., a monolayer) may be defined between the thin film 908 and the lid surface 41 in the imaging space 930, and the imaging sensor may be used to image the sample as described previously for thin sample layers held between the sensor surface 19 and the lid surface 41. Lighting elements and optical elements may be used to illuminate the sample.

In some implementations, the thin film 908 is less than 5.0 µm thick. In some implementations, the thin film 908 is less than 3.0 µm thick. In some implementations, the thin film 908 is less than 2.0 µm thick. In some implementations, the thin film 908 is less than 1.0 µm thick. In some implementations, the thin film 908 is less than 750 nm thick. In some implementations, the thin film 908 is less than 500 nm thick. In some implementations, the thin film 908 is less than 300 nm thick.

In some implementations, the thin film 908 is thin enough to allow at least a portion and in some cases all of the sample 27 to be within a near-field distance of the imaging sensor (e.g., the sensor surface). The near-field distance may be, for example, less than ten times a wavelength of light emitted by optical elements of the device, or less than five times a wavelength of light emitted by optical elements of the device, or less than two times a wavelength of light emitted by optical elements of the device, or less than a wavelength of light emitted by optical elements of the device. In some implementations, a near-field distance may be less than ten times a wavelength of light to which the imaging sensor is sensitive, or less than five times a wavelength of light to which the imaging sensor is sensitive, or less than two times a wavelength of light to which the imaging sensor is sensitive, or less than a wavelength of light to which the imaging sensor is sensitive.

For example, if a near-field distance is defined as 1000 nm, the thin film 908 is 300 nm thick, and the thin film 908 is 100 nm above the sensor surface 19, then a 600 nm-thick portion of the sample will be within the near-field distance of the imaging sensor. Such a configuration is shown schematically, and not to scale, by distance 934 in FIG. 20.

In some implementations, the near-field separation between sample and imaging sensor allows the imaging sensor to directly captures images of the sample, even with the thin film 908 in between the imaging sensor and the sample. In some implementations, individual pixels of the imaging sensor may directly capture adjacent portions of the sample.

The thin film 908 may be made of, for example, mylar, polyethylene terephthalate, another thermoplastic polymer, another plastic, another thermoplastic, another polymer, or another ultra-thin, transparent material, or combinations and layers of them. The thin film 908 can both be thin enough to achieve the near field criterion mentioned above and also be strong enough to resist damage or puncturing during the process of installing and unloading the cassette. In some implementations, the thin film 508 has an optical function. For example, the thin film 908 may have a combination of index of refraction and thickness such that light reflections off of the thin film 908 are reduced In some implementations, the cassette 900 is disposable. In some implementations, the cassette 900 is made of plastic. In some implementations, the cassette 900 includes spacers on the inner surface of the thin film 908, the spacers defining a minimum distance between the lid surface 41 and the thin film 908. The spacers may include separate elements attached to the thin film 908 (e.g., beads or other particles), the separate elements having dimensions configured to set the distance between the lid surface 41 and the thin film 908 when the lid surface 41 is placed on a sample on the thin film 908.

In some implementations, the cassette 900 includes agents on the thin film 908. For example, the agents may be dried onto the inner surface of the thin film 908 ahead of time, or otherwise attached or disposed on the thin film 908 ahead of time, such that, when a sample is loaded onto the thin film 908, the agents interact with elements of the sample.

For example, the agents may include one or more of an anticoagulant, a diluent, a stain, or an attachment unit configured to attach to an element (e.g., a molecule) in the sample. One or more types of attachment unit may be configured to bind (by a specific by an affinity determined by, for example, a structure of the attachment units) to one or more corresponding species in the sample. Attachment units may include, for example, antibodies and/or recombinant viral proteins. In some implementations, the attachment units are configured to also bind to a labeling element, e.g., a microbead or a fluorescent label. The attachment units may be pre-bound to the labeling elements when pre-positioned on the thin film 908, or the attachment units and labeling elements may be separated attached to the thin film 908 so as to bind to one another in the sample after the sample is added. When the sample is imaged, the labeling elements can be identified in images and used to determine characteristics of the sample.

In some implementations, attachment units on the thin film 908 may be bound to the thin film 908, e.g., in indexed locations so as to enable location-based assays.

Attachment units, in conjunction with the sample manipulation and imaging features described throughout this disclosure, can be used to perform various assays, e.g., immunoassays and serology. In some implementations, a pack of multiple disposable cassettes is provided, and the multiple cassettes in the pack are provided with different types of agents (e.g., attachment units configured to bind to different types of target elements in the sample). A user may select, at time of sample imaging, a cassette provided with one or more particular desired agents, e.g., agents that allow for one or more particular assays to be conducted.

Further details on the attachment units, beads, and associated methods can be found in U.S. Pat. Nos. 10,753,851, 10,684,278, and U.S. Patent Application Publication No. 2020/0309777, the entirety of each being incorporated herein by reference in its entirety.

In some implementations, a small gap 936 (shown in FIG. 20) may remain between the sensor surface 19 and the thin film 908. Air in the gap may have an index of refraction differing from that of the imaging sensor, the thin film 908, and/or the sample itself. Therefore, a thin layer of liquid, for example, water or alcohol, may be placed on the sensor surface 19 before insertion of the cassette 900 in order to fill the gap 936 and provide a more uniform index of refraction along a light path through the sample and the thin film 908 to the imaging sensor.

Although the cassette 900 has been described in the context of implementations shown in FIGS. 1-16C, the cassette 900 may be implemented in other devices and configurations. For example, the cassette 900 and the lid 43 may be integrated together into a disposable unit. The cassette 900 may be configured to move (e.g., be moved toward and away from the sensor surface 19 and/or the lid surface 41) in order to mix the sample.

Use of the cassette 900 can provide advantages. For example, the sensor surface may not need to be cleaned between sample imagings, because the cassette 900 prevents the sample from contacting the sensor surface or the device platform. A variety of cassettes may be available, each including one or more different agents, enabling analysis of particular types of sample by the selection of the appropriate cassette.

Cassettes as described herein may be manufactured according to a variety of processes. In some implementations, a thin film is stretched onto an aperture of a frame (e.g., a cassette frame as described herein). An adhesive may be applied to the frame before the thin film is applied, in order to attach the thin film to the frame.

The frame and thin film are placed into a mold having a planar surface to contact a first side of the thin film. Pressure is applied to a second side of the thin film opposite the first side, e.g., by a stamp. For example, the second side may be the side onto which a sample is placed for imaging, and the first side may be the side that is closer to the sensor surface when the cassette is in position for sample imaging. In some implementations, heat is applied along with the pressure.

The pressure (and, in some implementations, heat) mold the thin film to a desired flatness and/or thickness. For example, in some implementations, the thin film before molding is too thick for a near-field distance to exist between sample and imaging sensor, and the molding process thins the thin film to have a smaller thickness, e.g., a thickness as described for thin film 908. In some implementations, the thin film before molding is not flat (e.g., includes excess material relative to a size of the aperture over which the thin film is stretched), and the molding makes the thin film flatter across the aperture.

Subsequent to molding, any portions of the thin film that extend beyond the frame outside the aperture may be removed (e.g., cut away).

Other implementations are also within the scope of the following claims.

For example, analogous imaging, counting, and measurements of samples besides blood, including urine, sputum, and inanimate particulate suspensions are also possible.

Although many of the components of the imaging device have been described as round, including aspects of the base assembly and the platform, they can have a wide variety of other shapes, such as square or rectangular, that may better accommodate the desired shape of the sample space or provide means of ensuring alignment. For example, if the imaging sensor is a high-aspect-ratio sensor, the sample space could be elongated. Any rigid portions of the platform can be made with metals or plastics that are resistant to cleaning and disinfection agents.

While we have described a platform made of alternating rigid and pliable segments, other configurations are also possible. For example, the pliant portions might extend to cover the rigid segment 13, such that there is a single pliant surface stretching between rigid segments 16 and 14. Pliant portions could also be incorporated into other elements of the platform (for example, at the points of connection between the platform and the base assembly) in order to improve the seal between the platform and the base assembly, for ease of manufacturing, or for another reason. A wide variety of implementations, each encompassing at least a movement portion and a platform configuration meant to limit contact between the sample and the base assembly, are possible.

Although FIG. 15 shows the protruding element 125 to include a trapezoidal prismatoid, in other implementations it could include a truncated cone or other shape. If the protruding element terminated in a truncated cone, the lid surface 41 that bounds the top of the imaging space would be a circle, and other components including the peripheral surface 54 and the sensor surface could also have different shapes that would both maintain an imaging space between the sensor surface and the lid surface 41 and also maintain a well space for excess sample material. In some implementations, the protruding element is a solid with a facet (i.e., a planar surface).

In some implementations, the lid surface 41 can be composed of a flexible membrane spread across a rigid frame. The membrane is "elastic" in the sense that it is capable of deforming as a force is applied towards its surface and then has the ability to conform back to a flat surface after the applied force is removed. For example, the flexible membrane can be used to prevent the application of a rigid force on top of the sample above the sensor surface 19 as the lid is moved towards the sensor surface. This ensures that the top of the protruding element 125 pushes down on the sample due only to a gentle, predetermined force to displace the excess volume from the chamber formed between the truncated top of the protruding element 125 (i.e., the surface that faces the surface 19 of the imaging sensor 31) and the surface 19 of the imaging sensor 31.

In some implementations, the device can incorporate a vibrating mechanism to vibrate the device as the lid surface is brought towards the imaging sensor. The vibrating mechanism can, for example, facilitate movement of the lid surface towards the imaging surface. The vibrating mechanism can, for example, facilitate mixing of the sample.

While this description has referred repeatedly to a "sensor surface," samples may in fact be separated from the sensors themselves by one or more thin layers. Such layers may act to protect the sensors or to promote sample adhesion. Layers can also be optically active, possibly encompassing polarization filters, wavelength filters, microlenses, or combinations of these and other layer types.

The layers may be thin enough to allow at least a portion and in some cases all of a sample to be within a near-field distance of the sensor. The near-field distance may be, for example, less than ten times a wavelength of light emitted by optical elements of the device, or less than five times a wavelength of light emitted by optical elements of the device, or less than two times a wavelength of light emitted by optical elements of the device, or less than a wavelength of light emitted by optical elements of the device. In some implementations, a near-field distance may be less than ten times a wavelength of light to which the imaging sensor is sensitive, or less than five times a wavelength of light to which the imaging sensor is sensitive, or less than two times a wavelength of light to which the imaging sensor is sensitive, or less than a wavelength of light to which the imaging sensor is sensitive.

Although some of the implementations have been described as being portable, features of these devices can be applied to non-portable devices also.

All or part of the processes described herein and their various modifications (hereinafter referred to as "the processes"), including apparatus control functions (e.g., movement, illumination, and image capture instructions) and analysis functions (e.g., image analysis) can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit). Other embedded systems may be employed, such as NVidia® Jetson series or the like.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Processors or computer systems "configured" to perform one or more of the processes, algorithms, functions, and/or steps disclosed herein include one or more general or special purpose processors as described herein as well as one or more computer and/or machine-readable storage devices on which computer programs for performing the processes are stored.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

Components may be coupled (e.g., communicably coupled) over one or more networks or physically within a device. Coupling may include the capability to transmit data, including instructions, back and forth between the components.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Particular embodiments of the subject matter have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous. In addition, other actions may be provided, or actions may be eliminated, from the described flows, and other components may be added to, or removed from, the described systems. Likewise, actions depicted in the figures may be performed by different entities or consolidated. Furthermore, various separate elements may be combined into one or more individual elements to perform the functions described herein.

What is claimed is:

1. An apparatus comprising:
   a base assembly including an imaging sensor having a sensor surface to receive a sample;
   a first rigid platform segment surrounding the imaging sensor, the first rigid platform segment connected to the base assembly and comprising an aperture configured to receive a lid surface of a lid in a position to define an imaging space between the sensor surface and the lid surface;
   a second rigid platform segment surrounding the first rigid platform segment and spaced laterally apart from the first rigid platform segment, wherein the second rigid platform segment is configured to receive the lid resting on top of the second rigid platform segment, wherein the second rigid platform segment is movable toward and away from the base assembly, and
   wherein the second rigid platform segment is arranged such that movement of the second rigid platform segment toward and away from the base assembly results in the lid surface moving toward and away, respectively, from the sensor surface; and
   a pliant material coupled between the first rigid platform segment and the second rigid platform segment and arranged below the lid resting on the second rigid platform segment, wherein the pliant material has a flexibility that permits the movement of the second rigid platform segment toward and away from the base assembly.

2. The apparatus of claim 1 in which the first rigid platform segment has a fixed position with respect to the base assembly.

3. The apparatus of claim 1 in which the first rigid platform segment, the second rigid platform segment, and the pliant material are ring-shaped.

4. The apparatus of claim 1, wherein the pliant material coupled between the first rigid platform segment and the second rigid platform segment is a first continuous portion of the pliant material, and wherein the apparatus further comprises a second continuous portion of the pliant material coupled to the second rigid platforms segment,
   wherein the first continuous portion of the pliant material and the second continuous portion of the pliant material are discontinuous with respect to one another.

5. The apparatus of claim 4 in which the second continuous portion of the pliant material is arranged circumferentially and concentrically around the aperture and the first continuous portion of the pliant material, and
   wherein the first continuous portion of the pliant material and the second continuous portion of the pliant material have two different radii.

6. The apparatus of claim 1, comprising a movement mechanism coupled to the second rigid platform segment, wherein the movement mechanism is controllable to adjust a distance between the lid surface and the sensor surface.

7. The apparatus of claim 1, comprising a motor configured to move the second rigid platform segment with respect to the base assembly.

8. The apparatus of claim 1, comprising a peripheral surface configured to laterally bound a sample space situated between the peripheral surface, the sensor surface, and the lid surface.

9. The apparatus of claim 8 in which the sample space includes the imaging space.

10. The apparatus of claim 8 in which the sample space is configured to receive sample overflow from the imaging space.

11. The apparatus of claim 1 in which a top surface of the second rigid platform segment comprises one or more protrusions or depressions configured to receive the lid.

12. The apparatus of claim 11 in which the one or more protrusions or depressions are configured to mate with one or more corresponding protrusions or depressions formed by the lid.

13. The apparatus of claim 11 in which the one or more protrusions or depressions cause the lid to rest on the second rigid platform segment in a tilted orientation.

14. The apparatus of claim 1 comprising the lid having the lid surface.

15. The apparatus of claim 14 in which the lid surface comprises a protruding element that is configured to fit into the aperture.

16. The apparatus of claim 15 in which the protruding element comprises a trapezoidal prism.

17. The apparatus of claim 15 in which protruding element comprises a truncated cone.

18. The apparatus of claim 14 in which the lid is disposable.

19. The apparatus of claim 14 in which the lid and the second rigid platform segment are configured so that, as the lid is moved towards the base assembly while the sample is in the imaging space, the lid comes to rest on the sample and becomes unsupported by the second rigid platform segment.

20. The apparatus of claim 14 in which the lid and the second rigid platform segment are configured so that, as the lid is moved towards the base assembly, the lid surface becomes parallel to the sensor surface.

21. The apparatus of claim 14, comprising one or more agents disposed on the lid surface.

22. The apparatus of claim 1 in which the pliant material is resistant to at least one cleaning or disinfection agent.

* * * * *